United States Patent [19]

Buchwitz et al.

[11] Patent Number: 5,552,993
[45] Date of Patent: Sep. 3, 1996

[54] AUDIO INFORMATION APPARATUS FOR PROVIDING POSITION INFORMATION

[75] Inventors: Guy R. Buchwitz, Oxnard; David H. Muskat, Camarillo, both of Calif.

[73] Assignee: The United States of America as represented by the Secretary of the Navy, Washington, D.C.

[21] Appl. No.: 349,757

[22] Filed: Dec. 5, 1994

Related U.S. Application Data

[63] Continuation-in-part of Ser. No. 335,560, Nov. 7, 1994, Pat. No. 5,495,416.

[51] Int. Cl.$^6$ ................................................ G06F 15/50
[52] U.S. Cl. ................................. 364/449; 340/996
[58] Field of Search .......................... 342/386, 357; 364/450, 443, 361, 449; 340/996; 379/59; 395/2.1

[56] References Cited

U.S. PATENT DOCUMENTS

| | | | |
|---|---|---|---|
| 4,190,819 | 2/1980 | Burgyan | 340/23 |
| 4,490,717 | 12/1984 | Saito | 340/996 |
| 4,785,463 | 11/1988 | Janc et al. | 375/1 |
| 4,894,662 | 1/1990 | Counselman | 342/357 |
| 5,119,102 | 6/1992 | Barnard | 342/357 |
| 5,119,301 | 6/1992 | Shimizu et al. | 364/450 |
| 5,146,538 | 9/1992 | Sobti et al. | 395/2 |
| 5,153,836 | 10/1992 | Fraughton | 364/461 |
| 5,343,399 | 8/1994 | Yokoyama et al. | 364/449 |
| 5,367,306 | 11/1994 | Hollon et al. | 342/386 |
| 5,381,338 | 1/1995 | Wysocki et al. | 364/449 |
| 5,388,147 | 2/1995 | Grimes | 379/59 |
| 5,389,934 | 2/1995 | Kass | 342/357 |
| 5,406,491 | 8/1995 | Lima | 364/449 |
| 5,406,492 | 4/1995 | Suzuki | 364/449 |
| 5,410,486 | 4/1995 | Kishi et al. | 364/449 |
| 5,452,217 | 9/1995 | Kishi et al. | 364/449 |

*Primary Examiner*—Kevin J. Teska
*Assistant Examiner*—Stephen J. Walder, Jr.
*Attorney, Agent, or Firm*—David S. Kalmbaugh; Melvin J. Sliwka

[57] ABSTRACT

An audio information apparatus for providing position information as to the location of a target comprising a global positioning system receiver affixed to the target for generating a string of fifty nine ASCII characters representing the latitude and longitude spherical coordinates of the global positioning receiver affixed to the target. The ASCII characters are supplied to a microprocessor, which in response to the ASCII characters, formulates a position message indicating the current location of the global positioning system receiver. A pair of voice recorder/playback circuits, coupled to the microprocessor, have a message table which includes 27 messages or words which when assembled in a predetermined sequence form a longitude and latitude coordinate position message. When the voice recorder/playback circuits are in a message cueing mode, the microprocessor provides a predetermined number of active low chip enable pulses to a selected one of the pair of voice recorder/playback circuits to select the desired word from the table. The microprocessor then disables the message cueing mode which, in turn, enables an audio amplifier of the selected one of the voice recorder/playback circuits. When the microprocessor provides a subsequent chip enable pulse the message is output from the voice recorder/playback circuit to a transmitter for transmission to a ground station. The microprocessor continues this process of utilizing the message cueing mode followed by audio playback addressing mode to output each word of the longitude and latitude coordinate position message from the voice recorder/playback circuits to the transmitter.

17 Claims, 8 Drawing Sheets

5,552,993

AUDIO INFORMATION APPARATUS FOR PROVIDING POSITION INFORMATION

This application is a continuation-in-part of U.S. Ser. No. 335,560, now U.S. Pat. No. 5,495,416, filed Nov. 07, 1994.

BACKGROUND OF THE INVENTION

1. Field of the Invention

The present invention relates generally to audio information systems and is more particularly concerned with the use of a microprocessor for receiving positional information from a global positioning system receiver and converting the positional information to a digital format for a voice recorder/playback circuit which then provides an analog audio voice signal to a speaker which broadcasts the information.

2. Description of the Prior Art

In the past a variety of systems have been developed to provide audio information to indicate to the user their position or the position of an object that is being tracked by the user. Most such prior art systems which use audio signals or sound as a means for providing position information are relatively simple in design yet these systems are extremely limited as to their end use.

For example, U.S. Pat. No. 4,490,717 discloses a graphic display device which includes a cassette tape recorder which is used as a memory to store graphic data of the drive route. The cassette tape recorder includes a track which is used for voice. The content recorder on the voice track is converted to an electrical signal which is amplified by an amplifier and reproduced as a sound signal from a speaker.

U.S. Pat. No. 4,190,819 discloses a motor vehicle audio information system having a programmable automotive tape recorder that can automatically deliver sequential prerecorded messages concerning road information and the like at predetermined intervals. An electromechanical adapter connected to the odometer system of the vehicle provides pulses that are proportional to the distance traveled and these pulses are fed into a microprocessor which performs arithmetic and logic functions to drive a tape recorder with prerecorded messages. The system permits the distance data for programming the microprocessor and the related sequential message to be stored directly on the tape such as a prerecorded cassette or for the distance data to be stored in the memory of the microprocessor with the sequential messages on the tape only.

There are also in the prior art sophisticated audio systems which provide sound or audio information which is indicative of the position of a craft, either on land, sea or in the air being monitored. One such prior art craft tracking system is disclosed in U.S. Pat. No. 5,153,836. The system of U.S. Pat. No. 5,153,836 allows the position of a plurality of craft, either on land, sea or air to be monitored. Each craft determines its own position using an existing position determining system such as a Global Positioning System. Each craft then transmits a radio frequency signal into which position information, preferably identifying information, and other messages, have been encoded. Each craft broadcast its position, identifying information, and other messages on a regular basis without the need for any interrogation signal. The broadcast position and identification information can be received by other craft and, since each craft has determined its own position, can be used to determine the proximity and identity of other craft. An audio alarm system is provided which is integrated with a computer to apprise the operator of a craft of a potential collision or other situation requiring attention.

While each of these prior art sound or audio systems are generally satisfactory for their intended purpose, that of providing position information to a craft either having such a system or tracking another craft which has an audio system for indicating position, these prior art audio systems have certain limitations. For example, such prior art audio devices for indicating position are generally a built in to the craft which is using the system. In addition, their cost may be prohibitive preventing their use in, for example, automobiles, pleasure boats and small commercial aircraft.

There are also limitations with respect to the flexibility of these prior art audio or sound systems in that the systems require a predetermined or preprogrammed route to be followed by the craft using the system. Deviation from the preprogrammed route will cause system error resulting in the system being of little or no value to the user.

In addition, a number of these prior art audio or sound systems require a high degree of technical skills to operate thus significantly limiting the number of people who could use these systems.

Accordingly, there is a need for small, relatively simple in design, relatively inexpensive and highly reliable audio system which provides accurate position information to the user of a craft having such a system. Further, there is a need for a highly reliable audio system which when attached to a target indicates to the user of a craft tracking the target the exact location of the target.

SUMMARY OF THE INVENTION

With the present invention, the foregoing problems are substantially solved. The present invention comprises an audio information apparatus for providing position information as to the location of a target or a vehicle comprising a global positioning system receiver affixed to the target for generating a string of fifty nine ASCII characters representing the latitude and longitude spherical coordinates of the global positioning receiver affixed to the target. The fifty nine ASCII characters are supplied to a microprocessor, which in response to the fifty nine ASCII characters formulates a position message indicating the current location of the global positioning system receiver.

A pair of voice recorder/playback circuits, coupled to the microprocessor, have a message table which includes 27 messages or words which when assembled in a predetermined sequence form a longitude and latitude coordinate position message. When voice recorder/playback circuits are in a message cueing mode, the microprocessor provides a predetermined number of active low chip enable pulses to a selected one of the pair of voice recorder/playback circuits to select the desired words from the table. The microprocessor then disables the message cueing mode which, in turn, enables an audio amplifier of the selected one of the voice recorder/playback circuits. When the microprocessor provides a subsequent chip enable pulse the message is output from the voice recorder/playback circuit to a transmitter for transmission to a ground station or a target recovery vessel/chopper.

The microprocessor continues this process of utilizing the message cueing mode followed by audio playback addressing mode to output each word of the longitude and latitude coordinate position message from the voice recorder/playback circuits to the transmitter. The voice recorder/playback circuits provide an analog audio voice signal to the transmitter which conveys the longitude and latitude spherical coordinates for the current location of the global positioning system receiver. A mode may be selected by which a one kilohertz homing tone burst signal is sent to the transmitter between position messages.

During testing, the analog audio voice signal is also supplied to a speaker. The speaker then broadcasts the exact location of the global positioning system receiver.

DETAILED DESCRIPTION OF THE PREFERRED EMBODIMENT

Figure 1A:
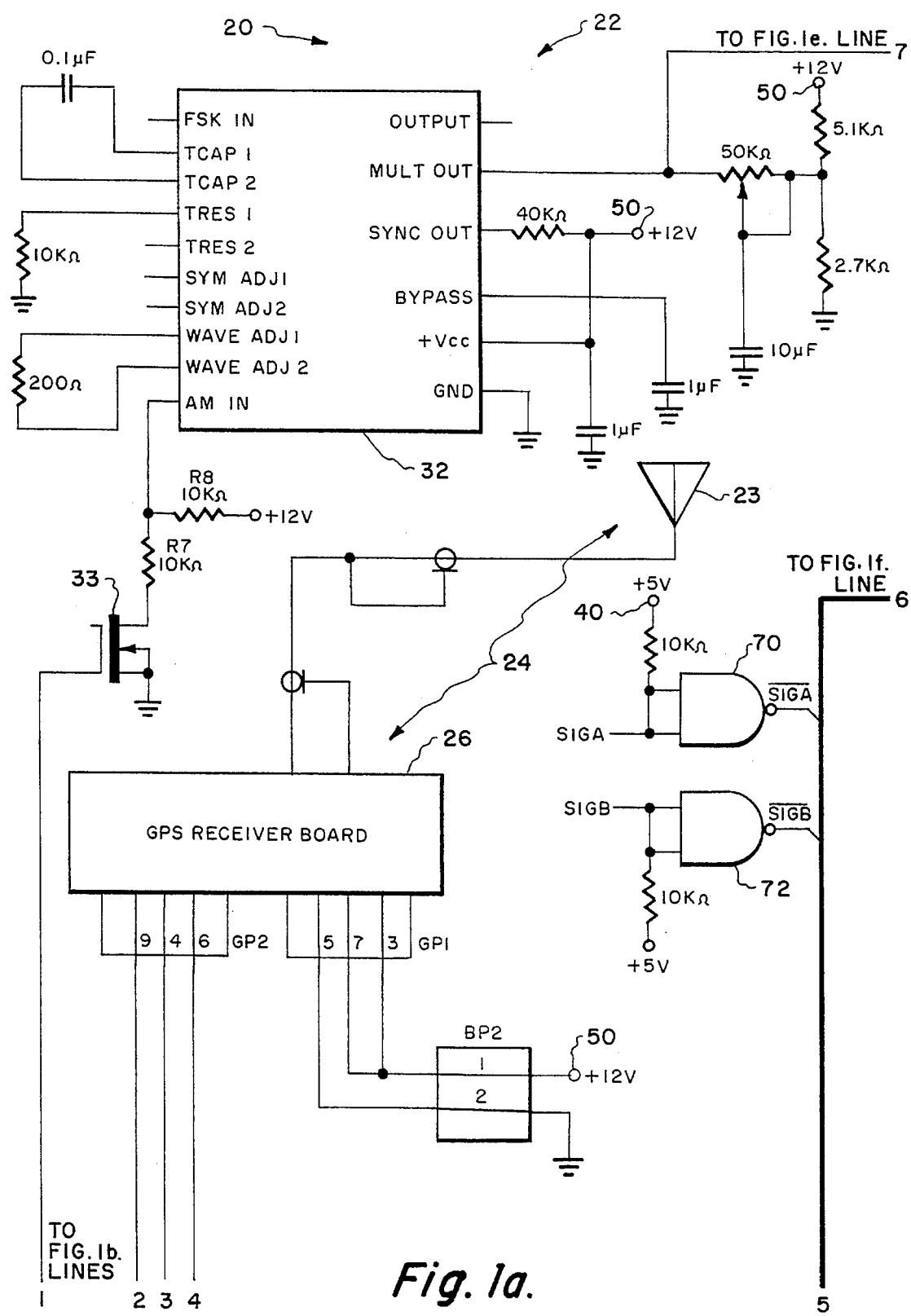
FIGS. 1a, 1b, 1c, 1d, 1e and 1f are a detailed electrical schematic of the electronics circuitry for the audio information apparatus for providing position information which constitutes the present invention.
Figure 1B:
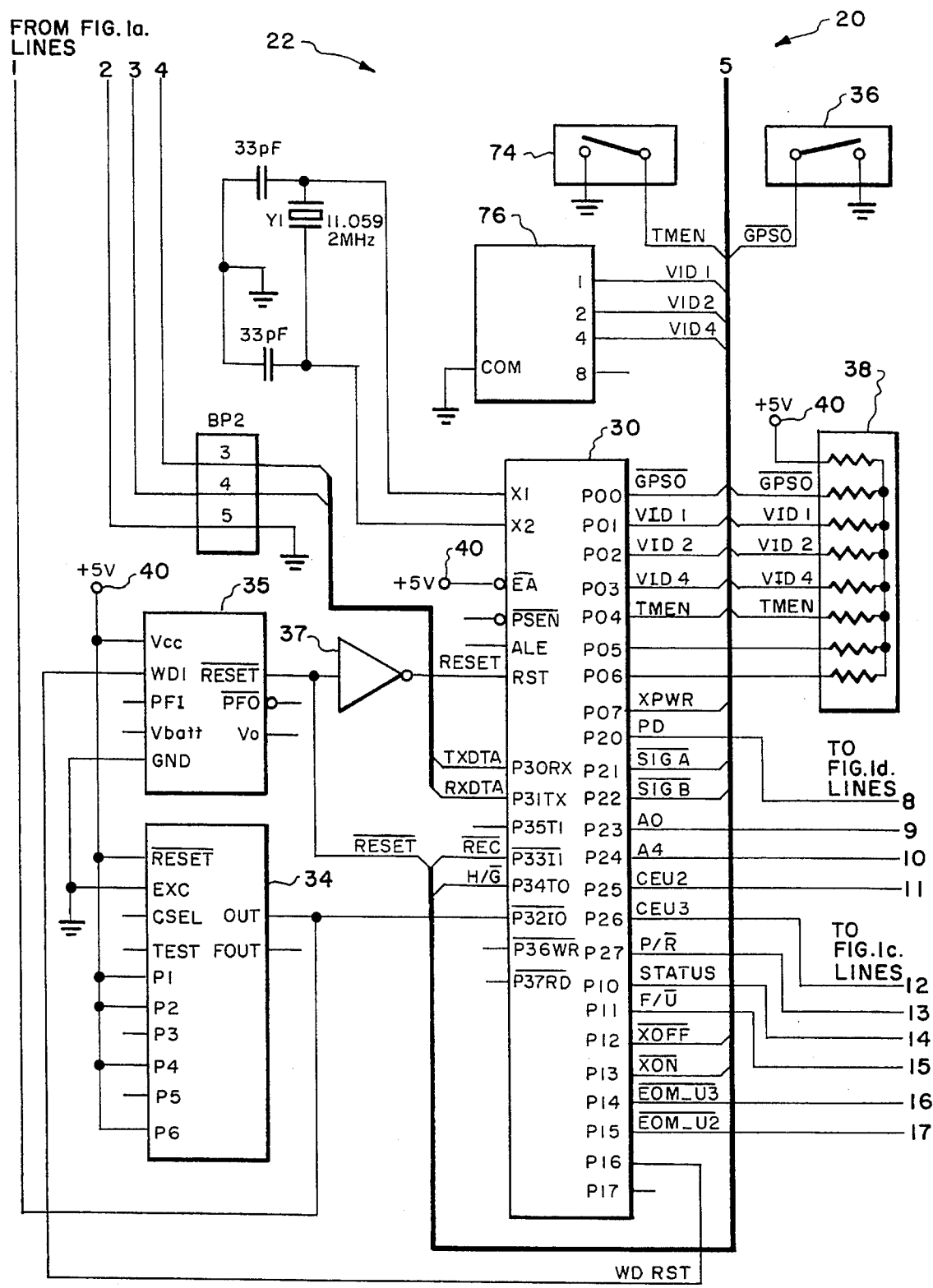
Figure 1C:
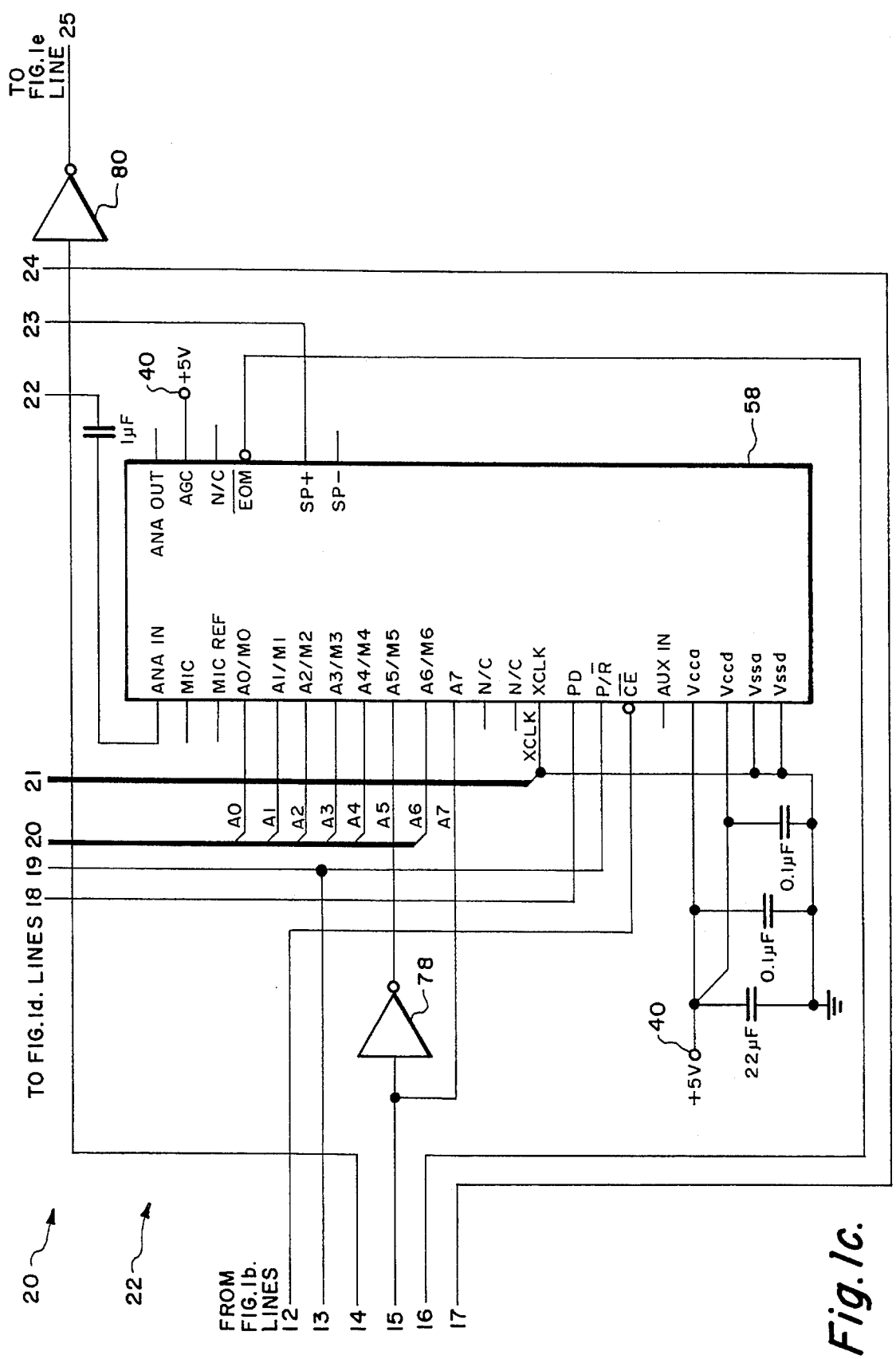
Figure 1D:
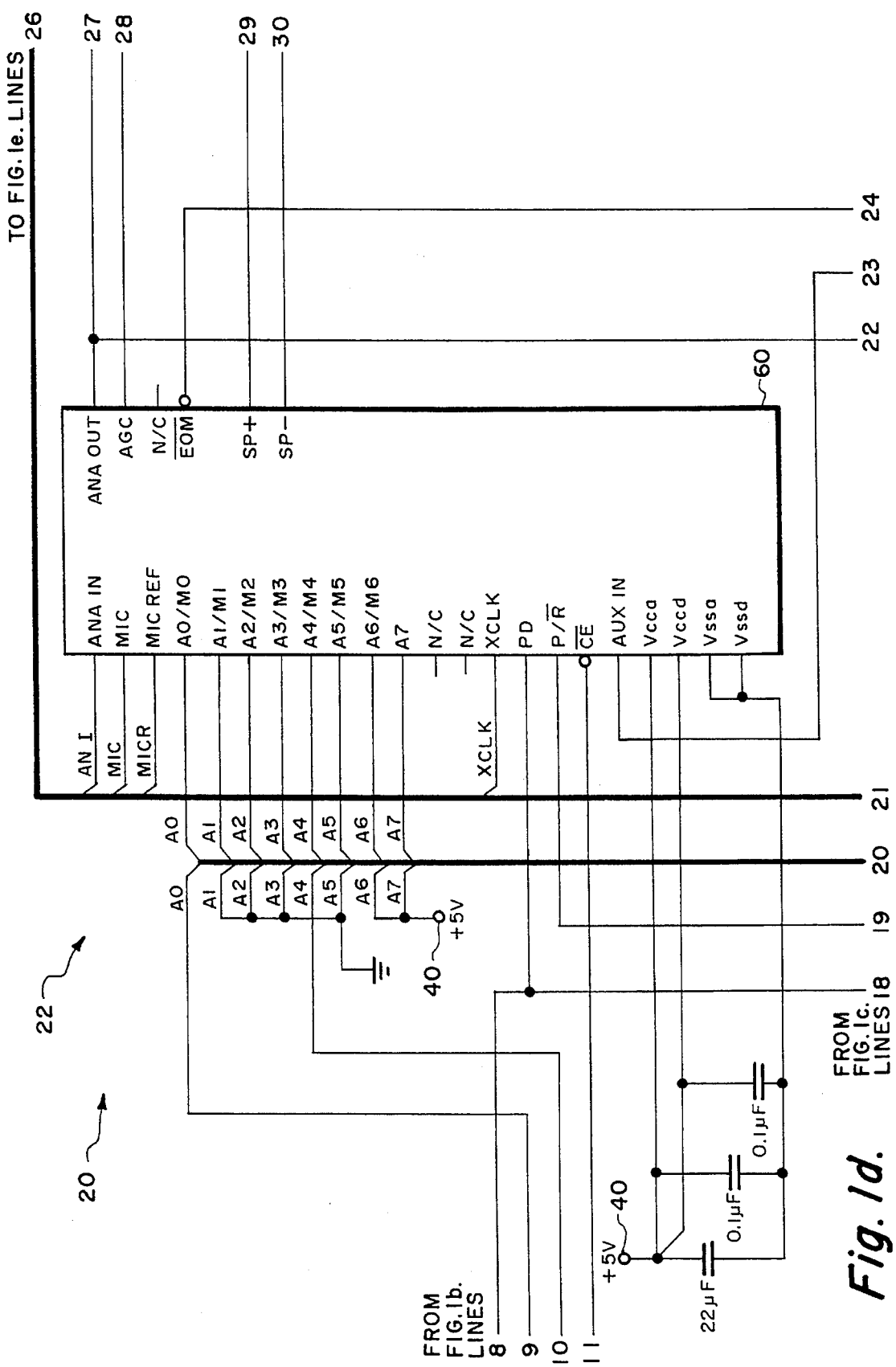
Figure 1E:
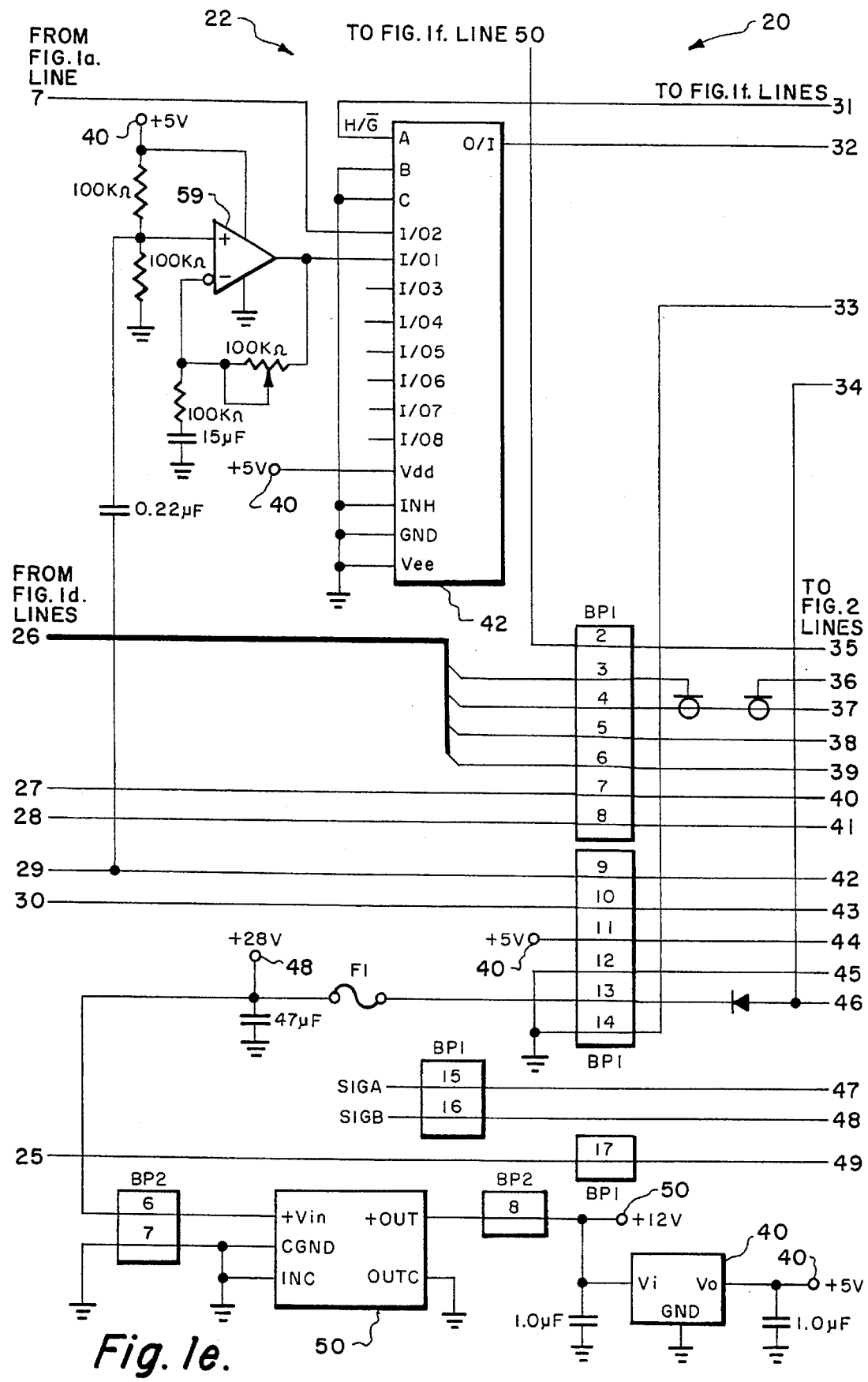
Figure 1F:
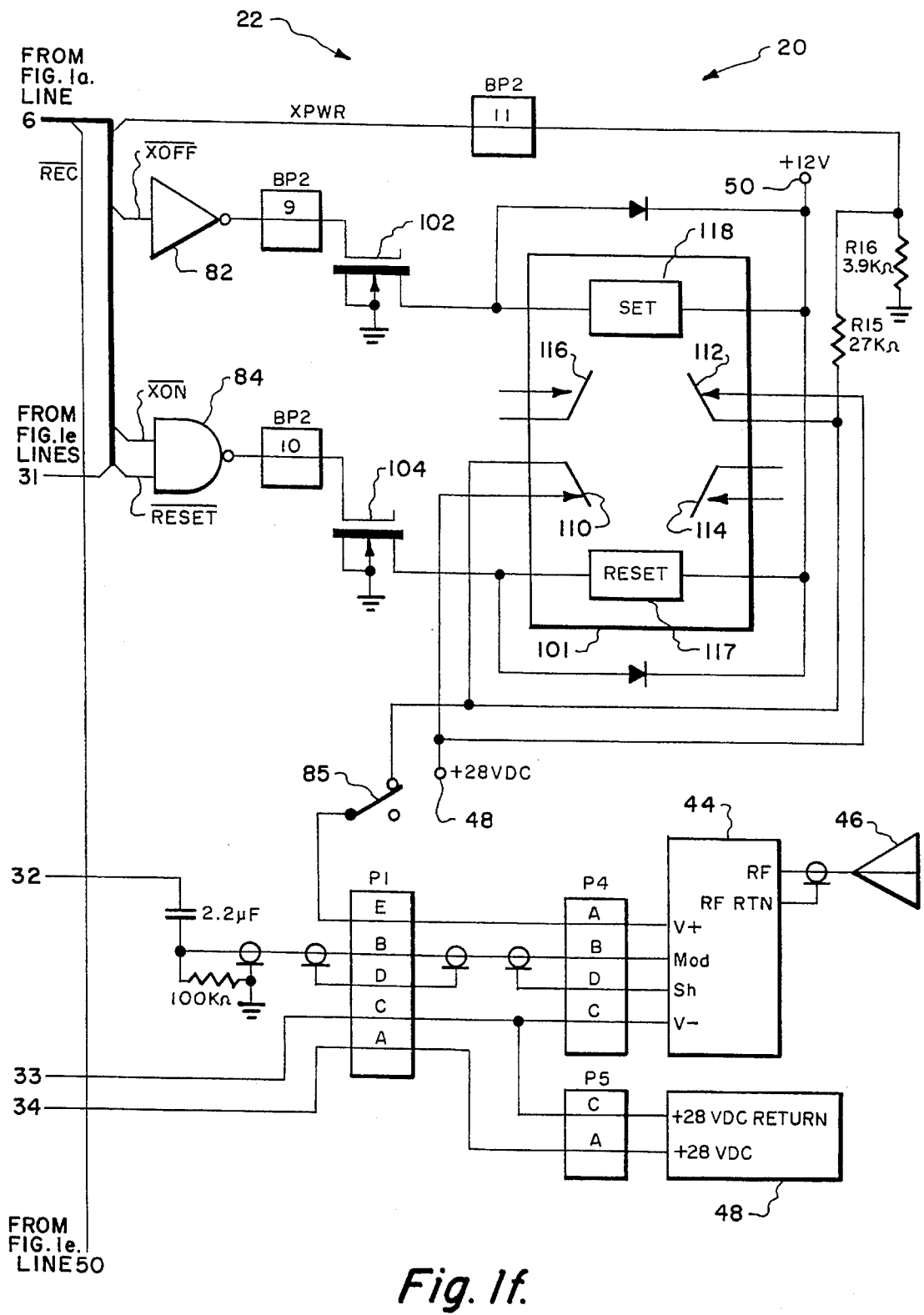

Referring first to FIGS. 1a, 1b, 1c, 1d, 1e and 1f there is shown the electronics circuit 20 for the audio information apparatus 22 constituting the present invention. Audio information apparatus 22 receives position data from at least three global positioning system satellites, not shown, which is supplied to the antenna 23 of a global positioning system receiver 24. Global positioning system receiver 24 includes antenna 23 and a global positioning system receiver board 26 which outputs position data in a TTL digital format via the TXDTA line to a microprocessor 30. There is also a RXDTA line connecting microprocessor 30 to global positioning system receiver board 26 allowing microprocessor 30 to communicate with receiver board 26. Microprocessor 30 provides a message to receiver board 26 via the RXDTA line requesting latitude and longitude positional data as well as a universal time code.

The global positioning system receiver board 26 selected for use in the present invention is a Magellan OEM GPS 5000 Receiver, Part No. 00-85000-000 manufactured by Magellan Systems Corporation of San Dimas, Calif. Receiver board 26 conforms to the NMEA (National Marine Electronics Association) 0183 software protocol for controlling data flow between receiver board 26 and microprocessor 30.

Referring to the computer program listing of Appendix A for the software of microprocessor 30, which is set forth in Appendix A, receiver board 26 provides a fixed message to microprocessor 30. This fixed message conveys longitude and latitude positional data from receiver board 26 to microprocessor 30. This fixed message is a series of fifty nine ASCII characters which for each ASCII character includes a start bit, eight data bits and a stop bit. The start bit is a logic zero and the stop bit is a logic one. The message also includes a checksum which is computed as each of the characters is provided to microprocessor 30 and then compared with a checksum provided with the message to verify that an error did not occur during message transmission.

The software of Appendix A initializes the P30RX serial input of microprocessor 30 to a baud rate of 9600 baud. Each ASCII character input to the P30RX serial input of microprocessor 30 generates an interrupt. The program counter of microprocessor 30 upon receiving the interrupt vectors to the interrupt service routine beginning at line 554 (SERIAL_PORT_ISR) of the software of Appendix A. If the stop bit is correct "(bit #10)=1" (line 561 of the software of Appendix A), a jump occurs to line 566 (STOP_BIT_OK) where a check is made to determine whether a "$" character has been received by microprocessor 30. If the received character is a "$", then a new message is being provided by receiver board 26.

When the received character is a "$" the received character counter and the receiver character buffer pointer within microprocessor 30 are initialized. The pointer when initialized points to a starting address within the receive buffer of RAM memory of microprocessor 30 within which latitude position data (RBUF_LAT_ 10D, line 1112 of Appendix A) from global positioning system receiver 24 is stored. The pointer is then incremented to allow for the storage of each additional ASCII character of longitude and latitude position data (lines 1112–1145 of Appendix A) from global positioning system receiver board 26 within the receive buffer of microprocessor 30.

When the stop bit is not a logic one a bit or flag is set indicating that there is a stop bit error. When the message is complete the software looks for any stop bit errors which have occurred during message transmission from receiver board 26.

The message from global positioning system receiver board 26 includes fifty nine ASCII characters which provides the longitude and latitude position information for the current location of global positioning system receiver 24. Lines 578–585 of the software of Appendix A insure that only fifty nine characters of position information are processed by microprocessor 30.

If less than sixty characters are received by microprocessor 30, than the software of Appendix A jumps to line 586 (RCHAR_CTR_OK).

At line 587 the software of Appendix A looks up a response code indexed by the received character counter. For each ASCII character received by microprocessor 30 from global positioning system receiver board 26 a response code is assigned with the codes being zero, one, two, three, four, five, six and seven. Based upon the response code in the software of Appendix A for each ASCII character, the software of Appendix A branches to a routine to process the received ASCII character.

The first ASCII character provided to microprocessor 30 by receiver board 26 is "G" (line 592 of Appendix A). The code assigned to the ASCII character "G" is a zero which results in the processing of line 654 of the software of Appendix A. This RESPOND routine moves the ASCII character "G" into checksum with the character "G" being the initial value of a newly computed checksum.

Each successive ASCII character with the exception of the last five ASCII characters (ASCII characters 55–59) are exclusive-ored into the checksum. Thus, for example, the second received ASCII character "P" is exclusive-ored with the character "G". The resulting computed checksum is then stored in the memory location within microprocessor 30 identified as checksum. The received character counter within microprocessor 30 is also incremented by a count of one for each ASCII character received by microprocessor 30. The incremented count, in turn, indicates the particular routine to be utilized in processing the received ASCII character.

At this time it should be noted that the LOC and OBJ codes are hexadecimal codes. For example at line 585 of the software of Appendix A the hexadecimal address 0380 has a value of 32 hexadecimal which is the operation code for the return from interrupt instruction.

The ASCII character at line 605 of the software of Appendix A will be utilized for the purpose of illustrating the operation of the response table/lookup table (RESPONSE_TABLE) of Appendix A. The ASCII character at line 605 is the latitude tens of degrees character provided by global positioning system receiver board 26. The response table for the fourteenth ASCII character assigns a response code of three to the accumulator of microprocessor 30. The software jumps through the RESPOND, RESPOND_TO_1, and RESPOND_TO_2 to the RESPOND_TO_3 routine at line 674. The ASCII character is then exclusive-ored into the checksum and saved, and the received character buffer pointer is incremented.

The fifty fifth received ASCII character from receiver board 26 is an the character "*" (line 646 of the software of Appendix A). This character which is not processed by the software of Appendix A functions as a delimiter. The fifty sixth received character is the checksum ASCII tens value. The code of six (line 647) in the response table causes the software of Appendix A to jump to the RESPOND_TO_6 routine (line 707). The RESPOND_TO_6 routine converts the checksum ASCII tens value into its hexadecimal numerical equivalent. The fifty seventh received character which is the checksum ASCII units value is converted to its hexadecimal numerical equivalent by the RESPOND_TO_7 routine which begins at line 715 of the software of Appendix A. A comparison is then made between the checksum provided by characters 56 and 57 and the computed checksum. If the comparison between the checksum provided by characters 56 and 57 and the computed checksum is not equal a jump occurs (line 718) to the DO_NOT_TRANSFER routine at line 739 of the software of Appendix A.

Whenever a flag is set indicating a stop bit error (line 719) the software of Appendix A also proceeds to the DO_NOT_TRANSFER routine at line 739 of the software of Appendix A.

When the checksum is validated and a stop bit error flag is not set, then the longitude and latitude position data is transferred to a transmit buffer within microprocessor 30. The only position data supplied to the transmit buffer within microprocessor 30 is data with a response codes of three and four. This position data includes latitude data with a response code of three which is in tens of degrees (line 605), degrees (line 606), tens of minutes (line 607), minutes (line 608), tenths of minutes (line 610) and hundredths of minutes (line 611). North or South latitude direction (line 613) is also provided by receiver board 26 to microprocessor 30 and then transferred to the transmit buffer within microprocessor 30. The response code for the North or South latitude direction ASCII character is four.

The position data also includes longitude data which is in hundreds of degrees (line 615), tens of degrees (line 616), degrees (line 617), tens of minutes (line 618), minutes (line 619), tenths of minutes (line 621) and hundredths of minutes (line 622). East and West longitude direction (line 624) is also provided by receiver board 26 to microprocessor 30 and then transferred to the transmit buffer within microprocessor 30. The response code for the East or West longitude direction ASCII character is four. The remaining data provided by receiver board 26 is not transferred to the transmit buffer within microprocessor 30.

At this time it should be noted that the microprocessor 30 used in the preferred embodiment of the present invention is 87C51H 8-bit CMOS microcontroller commercially available from INTEL corporation of Santa Clara, Calif.

Referring again to FIGS. 1a, 1b, 1c and 1d circuit 20 also includes a sinewave oscillator 32 which provides at its MULT OUT output a 1 KHz sinewave signal which is modulated by a one hertz square wave signal supplied to sinewave oscillator 32 by a programmable crystal oscillator 34. When the one hertz square wave signal is high, a field effect transistor 33 is turned on causing a voltage drop of about six volts across a resistor R8. This +6 VDC signal is supplied to the AM IN input of sinewave oscillator 32 turning off the MULT OUT output of sinewave oscillator 32. When the one hertz square wave signal is low transistor 33 is turned off which results in +12 VDC being supplied to the AM IN input of sinewave oscillator 32 turning on the MULT OUT output of sinewave oscillator 32. This six volt swing in voltage at the AM IN input of sinewave oscillator 32 results in a modulated 1 KHz sinewave signal occurring at the MULT OUT output of sinewave oscillator 32.

This modulated 1 KHz sinewave signal allows the user of audio information apparatus 22 to track a target having apparatus 22 attached thereto to track and recover the target by homing in on the 1 KHz modulated sinewave signal.

When a switch 36 is closed thereby connecting the P00 input of microprocessor 30 to ground which provides a logic zero to the P00 input of microprocessor 30 only longitude and latitude position coordinates are broadcast/transmitted by audio information apparatus 22. This, in turn, conserves power since transmitter 44 is on only when audio information apparatus 22 is broadcasting longitude and latitude position coordinates.

When it is required to broadcast/transmit both longitude and latitude position coordinates, the 1 KHz modulated sinewave signal switch 36 is opened setting the P00 input of microprocessor 30 to the logic one state. Circuit 20 includes pull up resistors 38 with each resistor 38 having one terminal connected to a voltage regulator 40 and its opposite terminal connected to an input P00–P06 of microprocessor 30. Voltage regulator 40, in turn, insures that a logic one will be supplied to P00–P06 inputs of microprocessor 30 whenever the P00–P06 inputs are not held low.

The one hertz square wave provided by oscillator 34 is also supplied to the/P32I0 input of microprocessor 30 which uses the one hertz square wave to count the number of seconds between messages selected by microprocessor 30 for a pair of voice recorder/playback circuits 58 and 60.

Microprocessor 30 controls the broadcasting/transmission of position data and the 1 KHz modulated sinewave signal by audio information apparatus 22. When microprocessor 30 provides at its P34T0 output (H//G line) a logic one, the logic one is supplied to the A input of an eight channel analog demultiplexer 42. This logic one enables the I/O2 input/output of demultiplexer 42 allowing the 1 KHz modulated sinewave signal from oscillator 32 to pass through demultiplexer 42 to transmitter 44 for transmission by an antenna 46 to a ground station or the like.

When microprocessor 30 provides at its P34T0 output (H//G line) a logic zero, the logic zero is supplied to the A input of demultiplexer 42. This logic zero enables the I/O1 input/output of demultiplexer 42 allowing latitude and longitude position data to pass through demultiplexer 42 to transmitter 44 for transmission by an antenna 46 to a ground station or the like.

It should be noted that whenever a system failure occurs audio information apparatus 22 defaults to a mode of operation wherein only the modulated 1 KHz sinewave signal is transmitted/broadcast by audio information apparatus 22.

An external 28 volt DC power supply 48 supplies +28 VDC to audio information apparatus 22 through a fuse F1 to the +Vin input of a DC/DC converter 50. Converter 50 then supplies +12 VDC to voltage regulator 40 which, in turn, provides +5 VDC to a number of the logic elements of electronics circuit 20. Converter 50 is also connected to oscillator 32 supplying +12 VDC to oscillator 32. Power supply 48 may be, for example, a battery or some other external power source placed in a target which is using audio information apparatus 22.

When power is first turned on a microprocessor supervisory circuit 35 will receive +5 VDC from voltage regulator 40. Microprocessor supervisory circuit 35 then holds its /RESET output at the logic zero state for about fifty milliseconds. This logic zero is supplied to the input of an inverter 37 which provides a logic one RESET signal to microprocessor 30 resetting microprocessor 30. Microprocessor 30 also supplies a WD RST signal (watch dog reset), which must change logic state at least every one second, to the WDI input of microprocessor supervisory circuit 35. Whenever the WD RST signal remains either high or low for more than 1.6 seconds microprocessor supervisory circuit 35 provides a/RESET pulse to inverter 37 which inverts the pulse and then supplies the inverted /RESET pulse to microprocessor 30 resetting microprocessor 30.

Figure 2:
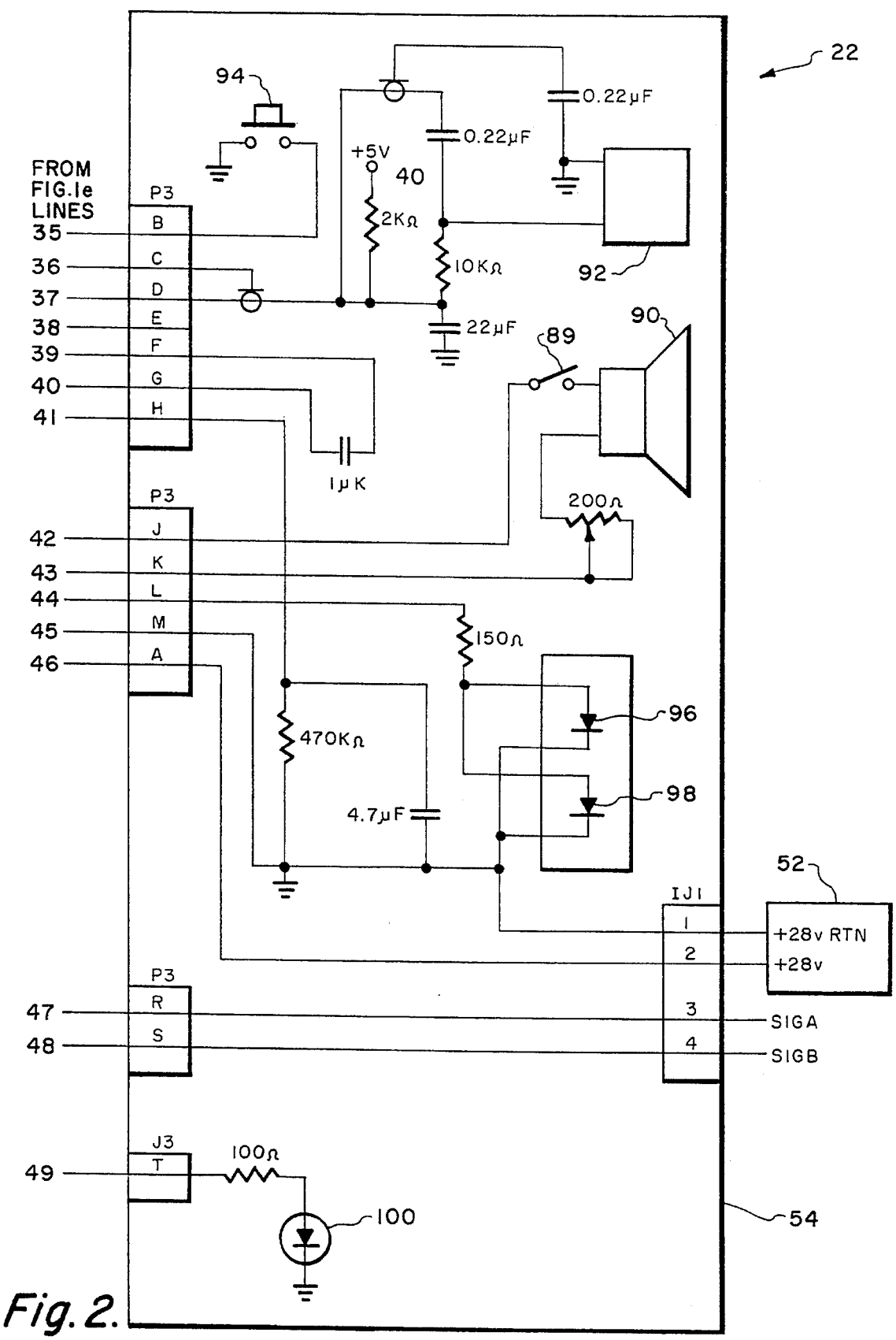
FIG. 2 is a detailed electrical schematic of the record/test circuit of the present invention.

A separate 28 volt DC power supply 52 (FIG. 2) is supplied to record/test circuit 54 (FIG. 2) when record/test circuit 54 (FIG. 2) is used to record position data onto voice recorder/playback circuits 58 and 60 or test electronics circuit 20.

Electronics circuit 20 includes a binary coded decimal switch 76 which is used for target/vehicle identification and allows for seven targets to be coded by using switch 76. It should be noted that whenever it is desired to record non-user-defined messages on voice recorder/playback circuits 58 and 60 of audio information apparatus 22, the output lines VID1, VID2 and VID4 of switch 76 are set to one which is position "0" on switch 76.

There is also a switch 74 which is not currently being utilized. This switch when open results in a logic one to the P04 input of microprocessor 30 which indicates to the microprocessor 30 to provide a digital burst of data in accordance with a predetermined format which includes the coordinates of specialized receiving systems.

A pair of external discrete logic signals SIGA and SIGB are also provided to audio information apparatus 22 through record/test circuit 54 to NAND gates 70 and 72 which buffer and invert these signals. The inverted logic signals /SIGA and /SIGB are next supplied respectively to the P21 and P22 inputs of microprocessor 30. These signals may, for example, be used with a salt water detector within a target to determine whether the target is immersed under water. These signals may also be used to indicate whether a target's parachute is deployed.

There is an XPWR signal supplied to the P07 input of microprocessor 30 which indicates whether transmitter enable switch 85 is receiving +28 VDC. A voltage divider circuit formed by resistors R15 and R16 which are respectively 27 Kilohms and 3.9 Kilohms supplies a +5 VDC signal to the P07 input of microprocessor 30 when transmitter enable switch 85 is connected to +28 VDC by relay 101.

When a logic zero /XON pulse is supplied to the first input of a NAND gate 84 by microprocessor 30, NAND gate 84 will invert this pulse to a logic one pulse which momentarily turns on field effect transistor 104. Turning on field effect transistor 104 provides for current flow from source 50 through transistor 104 to ground energizing the RESET coil 117 of relay 101. Energizing the RESET coil 117 of relay 101 closes contacts 110 and 112 of relay 101 providing +28 VDC power to transmitter enable switch 85. When switch 85 is closed +28 VDC is supplied to transmitter 44. This turns on power to transmitter 44 allowing transmitter 44 to transmit via antenna 46 position information from circuits 58 and 60 at a frequency within, for example, the radio frequency range which includes generally above 150 KHz to about 3000 gigahertz.

In a like manner, an active low /RESET pulse provided to the second input of NAND gate 84 turns on field effect transistor 104 which energizes the RESET coil 117 of relay 101. This also provides +28 VDC power to transmitter enable switch 85.

When a logic zero/XOFF pulse is supplied to the input of an inverter 82 by microprocessor 30, inverter 82 will invert this pulse to a logic one pulse which momentarily turns on field effect transistor 102. Turning on field effect transistor 102 provides for current flow from source 50 through transistor 102 to ground energizing the SET coil 118 of relay 101. Energizing the SET coil 118 of relay 101 closes contacts 114 and 116 of relay 101 which disconnects +28 VDC from transmitter enable switch 85. It should be noted that transmitter enable switch 85 must be in the closed position before energizing the RESET coil of relay 101 which will then allow +28 VDC to power transmitter 44

It should be noted that whenever audio information apparatus 22 is providing only longitude or latitude position coordinates, relay 101 is used to conserve power by turning on transmitter 44 when position messages are being transmitted and turning off transmitter 44 when position messages are not being transmitted. It should also be noted that when the modulated 1 KHz sinewave signal either alone or in combination with position messages are being transmitted by transmitter 44, power to transmitter 44 is not turned off.

The voice recorder/playback circuits 58 and 60 used in the preferred embodiment of the present invention are Model No. ISD1020A Single_Chip Voice Record/Playback Devices commercially available from Information Storage Devices of San Jose, Calif. The microprocessor supervisory circuit 35 is a Model MAX690 supervisory circuit commercially available from Maxim Integrated Products of West Peabody, Mass. The programmable crystal oscillator 34 is a Model PXO-600 Programmable Crystal Oscillator commercially available from Statek Corporation of Orange, Calif. The sinewave oscillator 32 is a Model XR-2206 Monolithic Function Generator manufactured by EXAR Integrated Systems, Inc. of Sunnyvale, Calif.

Operational modes of voice recorder/playback circuits 58 and 60 are enabled by taking address pins A7 and A6 high or at the logic one state. The states of address pins A5 through A0 determine control function and not the message address. The following table shows the operational modes of voice recorder/playback circuits 58 and 60 with each mode being selected by bringing the appropriate address high.

TABLE I

| Function | Address Control (High) |
|---|---|
| Message cueing (See note 1) | A0 |

TABLE I-continued

| Function | Address Control (High) |
| --- | --- |
| End-Of-Message markers are deleted by the next message use with A4 = 1 | A1 |
| During playback, End-Of-Message pulses low at array overflow only | A2 |
| Continuous playback | A3 |
| Consecutive addressing - Message start pointer is reset only when operational mode is changed (See note 2) | A4 |
| Playback is chip enable level activated | A5 |

Note 1.
Message cueing allows the user to skip through messages. Each time /CE memory is pulsed low with the address inputs set to this mode, the internal message pointer skips forward until it encounters an end-of-message marker and then stops. By providing a certain number of pulses to the /CE pin in message cueing mode and then changing to consecutive addressing mode, the user can select and then record or playback a desired message.
Note 2.
Consecutive addressing allows for recording and playback of consecutive messages without the need for direct addressing or any other kind of message management. During recording, each time that /CE is taken low, a message is recorded at the next position in memory. When /CE is taken high again, an end-of-message marker is written to indicate the position of the end of message. In this fashion a string of messages is recorded, each one placed immediately after the previous one.

Referring to FIGS. 1a, 1b, 1c, 1d, 1e, 1f and 2 and the computer software listing of Appendix A, the operation of audio information apparatus 22 in the playback mode will now be discussed.

Audio information apparatus 22 transmits longitude and latitude position information every two minutes. Beginning at line 314 (POWER_UP_XMTR) the transmitter 44 is powered up. The H//G line is cleared to the logic zero state by microprocessor 30 thereby providing a logic zero to the A input of demultiplexer 42 enabling its I/O1 input/output. Enabling the I/O1 input/output of demultiplexer 42 allows latitude and longitude position data to pass through demultiplexer 42 to transmitter 44 for transmission by an antenna 46.

The transmitter 44 is next turned on by energizing the RESET coil of relay 101 which, when transmitter enable switch 85 is closed, results in +28 VDC being provided to transmitter 44 (line 316). The P//R line is brought to the logic one state, FIG. 3C, by microprocessor 30 (line 317) resulting in logic ones at the P//R inputs of voice recorder/ playback circuits 58 and 60. An inter-position timer within microprocessor 30 is set for a two minute time period which is the time period between the start of each message transmission by audio information apparatus 22.

Beginning at line 321 of Appendix A alert tones are transmitted by audio information apparatus 22 by moving an address 15 hexadecimal (line 24) into a message variable and call a subroutine PLAY_MESSAGE subroutine (line 805). At line 805 a ten second time period is provided by microprocessor 30 to transmit the message by insuring that the WD RST signal (watch dog reset) changes logic state approximately every one second. This, in turn, prevents microprocessor supervisory circuit 35 from providing a /RESET pulse. The message variable 15 hexadecimal is next moved into the accumulator of microprocessor 30.

The first byte from the MESSAGE TABLE, which is four hexadecimal for ALERT_TONES (line 841), is loaded into the accumulator (line 810). The first byte indicates to microprocessor 30 the number of /CE pulses required for the particular message which will be transmitted by audio information apparatus 22.

The second byte from the MESSAGE_TABLE, which is three for ALERT_TONES (line 841), is also loaded into the accumulator (line 815). The second byte indicates to microprocessor 30 the voice recorder/playback circuits 58 or 60 having the message "ALERT TONES" stored therein. When the second byte is two the message is stored in circuit 60 and when the second byte is three the message is stored in circuit 58. Each byte of the message is stored in a variable VRPD message pointer (lines 811 and 816).

Figure 3:
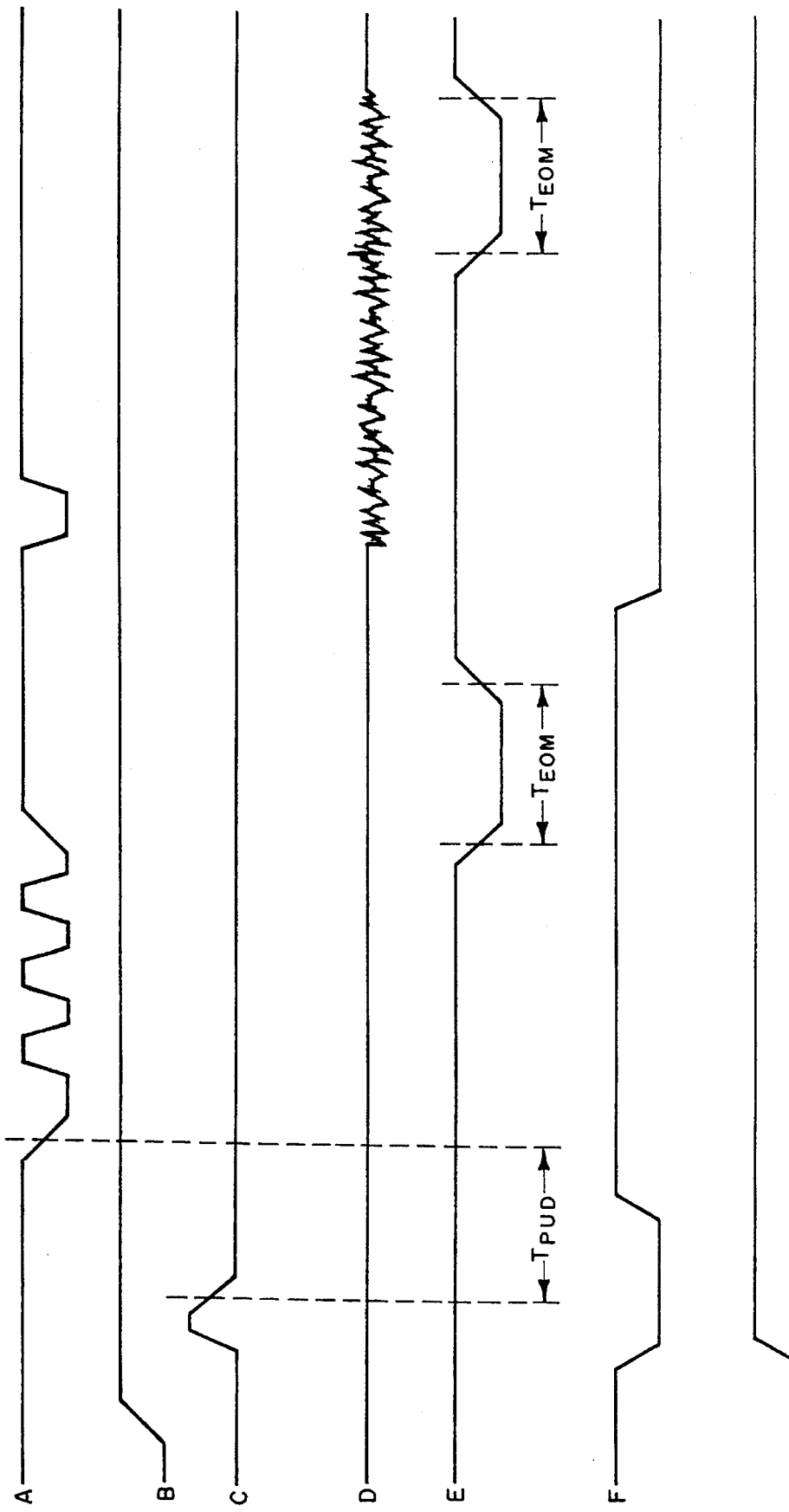
FIGS. 3A–3G are timing waveforms illustrating the signals required to effect the broadcasting of an "ALERT TONES" message by the audio information apparatus of FIG. 1.

The microprocessor 30 clears to the logic zero state the A0 line, FIG. 3F, assuming that message cuing is not required (line 849) for voice recorder/playback circuits 58 and 60. Microprocessor 30 next sets the A4 line, FIG. 3G, to the logic one state which selects the consecutive address mode of operation for circuits 58 and 60. The PD (power down) line is first set to the logic one state, FIG. 3B, by microprocessor 30 resetting both VRPD message pointers and then cleared to the logic zero state by microprocessor 30. This also resets the address counters within voice recorder/ playback circuits 58 and 60 to zero. The software of Appendix A provides for a thirty five millisecond power up delay identified as $T_{PUD}$ in FIG. 3 (lines 853 and 854).

At line 855 the device number which is either circuit 58 or circuit 60 is moved to the accumulator. Since the device number for the message ALERT_TONES is voice recorder/ playback circuit 58 a jump to line 881 occurs at line 856.

At line 882 the VRPD_MSG_PTR value is moved to the accumulator of microprocessor 30. If the value is zero cuing is not required and a jump occurs to line 897 which is PLAY_U3. The message "ZEERO" is stored in circuit 60 at a value of zero hexadecimal, while the message "LONGITUDE" is stored in circuit 58 at a value of zero hexadecimal.

Since the value for the message "ALERT TONES" is not zero the A0 line is set high by microprocessor 30 and all interrupts are disabled for ten microseconds. At lines 888 and 889 the first /CE pulse, FIG. 3A, is supplied by microprocessor 30 to the /CE input of voice recorder/ playback circuit 58. This process continues for three additional /CE pulses, FIG. 3A, since the cueing mode requires four /CE pulses for the "ALERT TONES" message. Microprocessor 30 then detects the logic one to zero transition of the /EOM pulse, FIG. 3E, supplied by circuit 58 to the P14 input of microprocessor 30. An approximately 17 millisecond time out is provided at line 892 and 892 of Appendix A. This time out is identified as $T_{EOM}$ in FIG. 3. It should be noted that holding A0 high in the cueing mode prevents circuits 58 and 60 from providing an analog audio voice signal at their SP+ and SP− outputs as is best illustrated by FIG. 3D.

At line 895 a loop is provided within the software until the value in a register R5 within microprocessor 30 is decremented to zero. In line 884 the number of /CE pulses required for the "ALERT TONES" message is loaded into register R4 with this number being four.

At line 896 the cueing mode is disabled by clearing the A0 line, FIG. 3F, allowing circuit 58 to provide the message "ALERT TONES" at its SP+ and SP− outputs. At lines 898–900 microprocessor 30 clears, sets and clears again the /CEU3 line generating a /CE pulse, FIG. 3A, which results in playback of the message "ALERT TONES", FIG. 3D, by voice recorder/playback circuits 58. The software loops until the /EOM signal, FIG. 3E, first transitions to the logic zero state and then transitions to the logic one state. When the rising edge of the /EOM signal, FIG. 3E, is detected by microprocessor 30 the software returns to line 324 which is the SEND_VEHICLE_ID subroutine. At lines 325 and 326, the message "TARGET" is transmitted by audio information apparatus 22 in exactly the same manner as the message "ALERT TONES" by using the PLAY_MESSAGE subroutine. At line 328 a position update flag is cleared. The position update flag which is set at line 730 indicates that a valid position message was received from global positioning system receiver board 26 by microprocessor 30.

The target ID bits are next read from binary coded decimal switch 76 by microprocessor 30 for transmission by audio information apparatus 22. At line 334 the PLAY_MESSAGE subroutine is called to allow audio information apparatus 22 to transmit the target identification which may be a number between one and seven.

At line 335 the status of global positioning system receiver board 26 is checked. Until a longitude and latitude position data is provided by receiver board 26, receiver board 26 supplies zeros to microprocessor 30. Whenever microprocessor 30 is receiving only zeros from receiver board 26, audio information apparatus 22 transmits the message "NO GPS" using the PLAY_MESSAGE subroutine (lines 337 and 338) followed by the message "POSITION" again using the PLAY_MESSAGE subroutine (lines 339 and 340).

Whenever receiver board 26 provides valid longitude and latitude position data to microprocessor 30, a jump occurs at line 336 to line 343 of Appendix A. If receiver board 26 supplies new longitude and latitude position coordinates to microprocessor 30 a jump occurs to line 347, otherwise audio information apparatus 22 transmits the message "LAST" using the PLAY_MESSAGE subroutine (lines 345 and 346).

Audio information apparatus 22 next transmits the message "POSITION" (lines 348 and 349). A five second delay is next provided in the software of Appendix A. A pointer R0 is initialized to the first address (#TBUF_START) in the transmit buffer of microprocessor 30 which has the current longitude and latitude position coordinates to be transmitted by audio information apparatus 22.

At lines 352–366 of Appendix A, audio information apparatus 22 first transmits two digits of a latitude position coordinate followed by the message "DEGREES"; two digits of latitude whole minutes followed by the message "POINT"; two digits of latitude hundredths of minutes followed by the message "MINUTES" and the direction North or South followed by the message "LATITUDE". A one second delay is next provided by the software of Appendix A before transmission of the longitude position coordinate.

At lines 368–382 audio information apparatus 22 transmits up to three digits of a longitude position coordinate followed by the message "DEGREES"; two digits of longitude whole minutes followed by the message "POINT"; two digits of longitude hundredths of minutes followed by the message "MINUTES" and the direction East or West followed by the message "LONGITUDE". A one second delay is next provided by the software of Appendix A after transmission of the longitude position coordinate.

At lines 348–399 of Appendix A, audio information apparatus 22 transmits the logic state of SIGA and the logic state of SIGB which is either one or zero.

At line 402 audio information apparatus 22 transmits a user-defined message which has an address of seventy one hexadecimal in voice recorder/playback circuit 58. The PLAY_USER_MESSAGE subroutine, which begins at line 758 of Appendix A, is called to effect the transmission of the user defined message. Used registers are saved (line 759) and the PD line is cleared by microprocessor 30 (line 762). At line 763, there is a thirty five millisecond delay before microprocessor 30 sets the P//R line high selecting playback mode for voice recorder/playback circuits 58 and 60. Microprocessor 30 next clears to the logic zero state the F//U line which is high for fixed messages and low for user defined messages. Lines 766–768 of the software provide an address of seventy one hexadecimal which is the address for the user defined message in circuit 58. A /CE pulse is next supplied to the /CE input of voice recorder/playback circuit 58 which then provides at its SP+ and SP– outputs an analog audio voice signal of the user defined message. The analog audio voice signal is then supplied through buffer 59 and demultiplexer 42 to transmitter 44 for transmission via antenna 46 to a ground station or the like.

It should be noted that closing switch 89 of record/test circuit 54 connects speaker 90 to voice recorder/playback circuits 58 and 60 allowing speaker 90 to broadcast the user defined message.

It should also be noted that record/test circuit 54 includes a status light emitting diode 100 which indicates to the user of audio information apparatus 22 that apparatus 22 is transmitting, for example, a longitude and latitude coordinate position message or a user defined message.

Audio information apparatus 22 allows user defined messages or messages of the type set forth at lines 20 through 36 of Appendix A to be recorded on voice recorder/playback circuits 58 and 60 by using microphone 92 and record button 94. Beginning at line 184 the software of Appendix A checks to determine whether audio information apparatus 22 is in a record mode (CHECK_FOR_RECORD_MODE). Whenever the output lines VID1, VID2, and VID4 of binary coded decimal switch 76 are at the logic one state a jump occurs to line 218 (POWER_UP_VRPD). The watch dog timer 35 is set for a time period of 120 seconds. Microprocessor 30 next sets the PD line to the logic one state and then sets /CEU2 and /CEU3 lines to the logic one state (lines 219–222) followed by a 0.1 second delay (line 223).

At lines 224–226 microprocessor 30 clears the PD line and then clears the A0 and A4 lines to the logic zero. Voice recorder/playback circuits 58 and 60 are now operational and are placed in a direct addressing mode. The status light emitting diode 100 is turned on to indicate to the user of audio information apparatus 22 that apparatus 22 is ready to record. At lines 232–235 the output lines VID1, VID2 and VID4 of switch 76 are again checked to determine whether the output lines are logic ones. Since microprocessor 30 complements/inverts the output lines VID1, VID2 and VID4 of switch 76 a jump occurs at line 236 only when the output lines VID1, VID2 and VID4 of switch 76 are not logic ones.

When a jump does not occur at line 236, a user defined message record interrupt is disabled. Disabling the user defined message record interrupt prevents the program counter from vectoring to an interrupt service routine which records the user defined message when record button 94 is pressed.

Light emitting diode 100 is activated by calling the FLICKER_STATUS_LED subroutine at line 790 of Appendix A. The software next enters a loop (WRITE_PROTECT_CHECK) which allows the user of audio information apparatus 22 to jump from a recording mode by changing at least one of the output lines VID1, VID2, and VID4 of switch 76 to the logic zero state. By changing at least one output line of switch 76 the user exits the loop and jumps to J_POWER_UP_XMTR at line 244.

The software will also exit WRITE_PROTECT_ CHECK whenever record button 94 is pressed which results in a logic zero being supplied to the /P33I1 input of microprocessor 30. A jump is provided within the software of Appendix A to line 249 which is PREPARE_TO_ RECORD.

At line 250 internal counters within voice recorder/playback circuits 58 and 60 are reset to a hexadecimal address of zero by microprocessor 30. At line 251 voice recorder/playback circuits 58 and 60 are re-enabled when the PD line is cleared to a logic zero state by microprocessor 30, followed by a 35 millisecond delay. Microprocessor 30 sets the A4 line high enabling the consecutive address mode for circuits 58 and 60 and then clears A0 which disables the cueing address mode for circuits 58 and 60. Microprocessor 30 next clears the P//R line to the logic zero state which places voice recorder/playback circuits 58 and 60 in a record mode.

A message pointer is initialized to zero and a sixty seconds time period is provided to record a message within voice recorder/playback circuits 60. The software loops until a logic zero is supplied to the /P33I1 input of microprocessor 30 by pressing record button 94 which connects ground to the P33I1 input of microprocessor 30. The software of Appendix A also provides for a debounce time period of 100 milliseconds (lines 261 and 262).

At line 264, microprocessor 30 clears the /CEU2 line which begins the recording of a message within circuit 60 and then turns on light emitting diode 100. The software continues to loop until either record button 94 is released or circuit 60 provides a logic zero through its /EOM output to microprocessor 30. It should be noted that circuits 58 and 60 provide a logic zero at their /EOM outputs whenever their capacity of twenty seconds of recording time is exceeded.

When the user releases record button 94 after recording the message a jump occurs to STOP_U2_RECORDING. Microprocessor 30 then sets the /CUE2 line to the logic one state which ends the recording of the message, followed by a 17 millisecond delay and turns off light emitting diode 100.

At line 278 the message pointer is incremented to record the next message. When the number of messages recorded within voice recorder/playback circuit 60 has not exceeded ten hexadecimal messages, the software returns to line 258 to record the next message.

When ten hexadecimal messages are recorded in voice recorder/playback circuit 60, microprocessor 30 flickers light emitting diode 100 twice indicating to the user of apparatus 22 that ten hexadecimal messages have been recorded within voice recorder/playback circuit 60. In a like manner, messages are recorded in voice recorder/playback circuit 58 (lines 286–312 of Appendix A).

At line 313 a jump occurs to line 205 (TEST_ALL_ MESSAGES). TEST_ALL_MESSAGES plays via speaker 90 the recorded messages at lines 20–36 of Appendix A and the user defined message which is directly addressed at seventy one hexadecimal.

When the record button is pressed and INT1 is enabled (line 408 of Appendix A) a user defined message may be recorded at hexadecimal address 71 of voice recorder/playback circuit 58. At line 450 subsequent interrupts from contact bounce of record button 94 are disabled. Used registers are saved (line 451) and the process status word is saved (line 452). In line 452 register bank 2 within microprocessor 30 is selected.

At line 455 the PD line is cleared to the logic zero state which powers up voice recorder/playback circuit 58, followed by a 100 millisecond time period to debounce the record button 94. Microprocessor clears the P//R line which places voice recorder/playback circuit 58 in a record mode and then clears the F//U line which selects direct addressing for the user defined message.

Microprocessor 30 next sets the A0 and A4 lines to the logic one state placing the address seventy one hexadecimal on the address lines A0–A7 of voice recorder/playback circuits 58 and 60. The A7, A6, A5, A4, A3, A2, A1 and A0 inputs of circuits 58 and 60 are respectively 0,1,1,1,0,0,0,1. By using the address 71 hexadecimal recorder/playback circuit 58 has about six seconds of record time for the user defined message.

Microprocessor 30 next clears the /CEU3 line to allow the user to begin recording the message. The software loops until the user releases the record button 94 or until the /EOM_U3 line is asserted, that is the /EOM_U3 line is at the logic zero state.

Microprocessor 30 sets the /CEU3 line high which ends the recording of the user defined message and then turns off light emitting diode 100. A seventeen millisecond delay is provided by the software of Appendix A and the PD line is set to the logic one state which powers down voice recorder/playback circuits 58 and 60.

From the foregoing description, it may readily be seen that the present invention comprises a new, unique and exceedingly useful audio information apparatus for providing position information as to the location of a target or the like which constitutes a considerable improvement over the known prior art. Obviously many modifications and variations of the present invention are possible in light of the above teachings. It is therefore to be understood that within the scope of the appended claims, the invention may be practiced otherwise than as specifically described.

Appendix A

MCS-51 MACRO ASSEMBLER    GLS4.ASM    10/19/94

```
DOS 5.0 (038-N) MCS-51 MACRO ASSEMBLER, V2.2
OBJECT MODULE PLACED IN TGLS4.OBJ
ASSEMBLER INVOKED BY:  C:\ICEDIR\ASM51.EXE TGLS4.ASM

LOC  OBJ        LINE     SOURCE

1       $DEBUG NOPAGING TITLE(TGLS4.ASM)
                 2
                 3       ;**********************************************************************
                 4       ;
                 5       ;       This is 8751 code for the TGLS4 GPS-to-voice target locating
                 6       ;       system.
                 7       ;
                 8       ;       Written by: Guy R. Buchwitz
                 9       ;             Date: September 22, 1994
                10       ;          Version: 1.15
                11       ;
                12       ;**********************************************************************
                13       ;       NOTE: Format tabs located at columns #5,10,18,23, and 30
                14       ;**********************************************************************
                15       ;
                16       ;       The following messages are expected to be stored as follows:
                17       ;       DEVICE    MSG      U2              MSG      U3
                18       ;       ADDR.     COUNT    MESSAGE         COUNT    MESSAGE
                19       ;
                20       ;       0h        0h       "ZEE-RO"        11h      "LONGITUDE"
                21       ;       1h        1h       "ONE"           12h      "LATITUDE"
                22       ;       2h        2h       "TWO"           13h      "POSITION"
                23       ;       3h        3h       "THREE"         14h      "RESET"
                24       ;       4h        4h       "FOUR"          15h      ALERT TONES
                25       ;       5h        5h       "FIFE"          16h      "NO GPS"
                26       ;       6h        6h       "SIX"           17h      "A IS"
                27       ;       7h        7h       "SEVEN"         18h      "B IS"
                28       ;       8h        8h       "EIGHT"         19h      "DEGREES"
                29       ;       9h        9h       "NINER"         1Ah      "MINUTES"
                30       ;       Ah        Ah       "NORTH"         N/A      USER-DEFINED MESSAGE
                31       ;       Bh        Bh       "SOUTH"                  (UDM directly addressed at 71h)
                32       ;       Ch        Ch       "EAST"
                33       ;       Dh        Dh       "WEST"
                34       ;       Eh        Eh       "TARGET"
                35       ;       Fh        Fh       "POINT"
                36       ;       10h       10h      "LAST"
                37       ;
                38       ;**********************************************************************
                39
                40       ;       Assign symbolic names to constants
00FC            41               P001_SEC_HI     EQU     0FCh    ;TIMER0 high byte preload for 1ms
0066            42               P001_SEC_LO     EQU     66h     ;  "    low-byte     "     "   "
                43                                               ;(11.0592 MHz/12)*0.001 sec = 922
                44                                               ;(2^16 - 922 = 64,614 = FC66h)
0003            45               PUD_TIME        EQU     35      ;Allow 35ms for VRPD Power-Up Delay
0011            46               EOM_TIME        EQU     17      ;Allow 17ms for rise of VRPD EOM following cue
00FD            47               BAUD_9600       EQU     0FDh    ;TIMER 1 reload value for 9600 Baud (11.0592MHz)
000E            48               BUF_LENGTH      EQU     14      ;Length of receive/transmit buffers (only 15
                49                                               ;characters in the GPGGA message convey position)
0078            50               I_P_TIME        EQU     120     ;Set inter-position time at 120 seconds
000A            51               GPS_TIME        EQU     10      ;Allow 10 seconds for GPS rcvr response
001A            52               MESSAGE_MAX     EQU     1Ah     ;Maximum message pointer value
```

```
0087           53           PCON      EQU    87h      ;ASM51 has no reserved symbol for PCON
               54
0080           55           nGPS0     BIT    P0.0     ;(I) Low if only GPS (no homing) info transmitted
0081           56           nVID1     BIT    P0.1     ;(I) LSB of Vehicle ID
0082           57           nVID2     BIT    P0.2     ;(I) Mid  "      "    "
0083           58           nVID4     BIT    P0.3     ;(I) MSB of Vehicle ID
0084           59           TMEN      BIT    P0.4     ;(I) High if tone-coded GPS data is to be sent
0087           60           XPWR      BIT    P0.7     ;(I) High if xmtr +28 Vdc is output from RLY1
               61
0090           62           nSTATUS   BIT    P1.0     ;(O) Low to light RTU STATUS LED
0091           63           F_u       BIT    P1.1     ;(O) High for fixed message, low for user message
0092           64           nXOFF     BIT    P1.2     ;(O) Pulse low to latch xmtr relay off
0093           65           nXON      BIT    P1.3     ;(O)   "    "   "    "     "    "   on
0094           66           nEOM_U3   BIT    P1.4     ;(I) Low when ISD U3 encounters End Of Message
0095           67           nEOM_U2   BIT    P1.5     ;(I)  "    "    "   U2      "       "   "   "
0096           68           WD_RST    BIT    P1.6     ;(O) Change state every second to avoid reset
               69
00A0           70           PD        BIT    P2.0     ;(O) High to power down ISDs U2 and U3
00A1           71           nSIGA     BIT    P2.1     ;(I) Inverted state of discrete "SIGA"
00A2           72           nSIGB     BIT    P2.2     ;(I)    "      "    "    "      "SIGB"
00A3           73           A0        BIT    P2.3     ;(O) Preset before nCEU2/3 for Message Cueing
00A4           74           A4        BIT    P2.4     ;(O)   "      "     "       "     "  Consecutive Addr.
00A5           75           nCEU2     BIT    P2.5     ;(O) Low to enable and latch ISD U2
00A6           76           nCEU3     BIT    P2.6     ;(O)  "  "   "      "   "    "   U3
00A7           77           P_r       BIT    P2.7     ;(O) High to playback, low to record
               78
00B0           79           TXDTA     BIT    P3.0     ;(I) GPS data received via serial port RX
00B1           80           RXDTA     BIT    P3.1     ;(O) GPS board config sent via serial port TX
00B2           81           ONE_Hz    BIT    P3.2     ;(I) Falling edge initiates nINT0 each second
00B3           82           nREC      BIT    P3.3     ;(I) RTU pulls low initiating nINT1 recording ISR
00B4           83           H_g       BIT    P3.4     ;(O) High gates 1KHz burst, low gates GPS audio
               84
----           85           CSEG                      ;Beginning of CODE segment
               86   BEGIN:
0000           87           ORG    0000h              ;Reset vector
0000 020026    88           JMP    INIT
               89
0003           90           ORG    0003h              ;INT0 (1 second) vector
0003 020287    91           JMP    INT0_ISR
               92
000B           93           ORG    000Bh              ;TIMER0 (0.05 second) vector
000B 0202D2    94           JMP    TIMER0_ISR
               95
0013           96           ORG    0013h              ;INT1 (RTU Record) vector
0013 02028E    97           JMP    INT1_ISR
               98
0023           99           ORG    0023h              ;Serial port vector
0023 020345    100          JMP    SERIAL_PORT_ISR
               101
               102  INIT:
0026 75815F    103          MOV    SP,#5Fh            ;Reserve 32 bytes for stack (#60h-7Fh)
0029 75D000    104          MOV    PSW,#00h           ;Reset status flags & select register bank 0
002C 7590FF    105          MOV    P1,#0FFh           ;Set all port pins as inputs (clamp xstr off)
002F 75A0FF    106          MOV    P2,#0FFh
0032 75B0FF    107          MOV    P3,#0FFh
0035 C296      108          CLR    WD_RST             ;Toggle MAX690 WDI
0037 752F00    109          MOV    RCHAR_CTR,#0
003A 752800    110          MOV    PRE_TICK,#0        ;Init non-changeable TIMER0 ISR 1ms counter
003D 752700    111          MOV    STATUS_LED_TICK,#0 ;Init serial port, RTU status LED counter
0040 752278    112          MOV    WDT,#I_P_TIME      ;Initialize TIMER0 Watch Dog Timer
0043 75230A    113          MOV    SS_WDT,#GPS_TIME   ;Initialize serial set WDT
0046 752400    114          MOV    FIFTY_MS,#0        ;Initialize TIMER0 WDT 50ms counter
0049 7832      115          MOV    R0,#RBUF_START     ;Clear buffers
004B 7941      116          MOV    R1,#TBUF_START
```

```
004D 5A0E      117            MOV    R2,#BUF_LENGTH
               118     CLEAR_BUF_LOOP:
004F 7600      119            MOV    @R0,#0
0051 08        120            INC    R0
0052 7700      121            MOV    @R1,#0
0054 09        122            INC    R1
0055 DAF8      123            DJNZ   R2,CLEAR_BUF_LOOP
               124
               125     INITIALIZE_REGISTERS:
0057 758921    126            MOV    TMOD,#21h
               127                                 ;MODE = 01 - TIMER0 = 16 bits wide
               128                                 ;C/t  = 0  - TIMER0 = timer (not a counter)
               129                                 ;GATE = 0  - TIMER0 is not gated
               130                                 ;MODE = 10 - TIMER1 = 8-bit auto-reload (baud rate gen.)
               131                                 ;C/t  = 0  - TIMER1 = timer (not a counter)
               132                                 ;GATE = 0  - TIMER1 is not gated
005A 758CFC    133            MOV    TH0,#P001_SEC_HI     ;Initiate TIMER0 for first 1ms int
005D 758A66    134            MOV    TL0,#P001_SEC_LO
0060 758DFD    135            MOV    TH1,#BAUD_9600  ;Init TIMER1 as BRG for 9600 baud
0063 758BFD    136            MOV    TL1,#BAUD_9600  ;... (init standard and auto-reload counters)
0066 758B13    137            MOV    IP,#13h
               138                                 ;PX0 = 1 - INT0 (1Hz) = higher priority
               139                                 ;PT0 = 1 - TIMER0 int = higher priority
               140                                 ;PX1 = 0 - INT1 (nREC) = lower priority
               141                                 ;PT1 = 0 - TIMER1 int (unused for BRG) = lower priority
               142                                 ;PS  = 1 - SERIAL PORT int = higher priority
               143                                 ;PT2 = 0 - N/A
               144                                 ;X   = 0 - Reserved
               145                                 ;X   = 0 - Reserved
0069 759870    146            MOV    SCON,#70h
               147                                 ;RI  = 0 - Reset pending serial port receiver int
               148                                 ;TI  = 0 - Reset pending serial port transmitter int
               149                                 ;RB8 = 0 - Reset pending received stop bit
               150                                 ;TB8 = 0 - Reset pending transmitted stop bit
               151                                 ;REN = 1 - Enable serial port receiver
               152                                 ;SM2 = 1 - Do not set RI unless valid stop bit received
               153                                 ;SM1 = 1 - 1 start bit (0), 8 data bits, 1 stop bit (1)
               154                                 ;SM0 = 0 - ...->RB8, variable baud rate (9600)
006C 758855    155            MOV    TCON,#55h
               156                                 ;IT0 = 1 - INT0 (1Hz)is falling-edge triggered
               157                                 ;IE0 = 0 - Reset INT0 (1Hz) interrupt flag
               158                                 ;IT1 = 1 - INT1 (nREC) is falling-edge triggered
               159                                 ;IE1 = 0 - Reset INT1 (nREC) interrupt flag
               160                                 ;TR0 = 1 - Enable TIMER0 (0.05 sec)
               161                                 ;TF0 = 0 - Reset pending TIMER0 overflow flag
               162                                 ;TR1 = 1 - Enable TIMER1 (BRG)
               163                                 ;TF1 = 0 - Reset pending TIMER1 overflow flag
006F 75A883    164            MOV    IE,#83h
               165                                 ;EX0 = 1 - Enable INT0 (1Hz)
               166                                 ;ET0 = 1 - Enable TIMER0 (0.05 second) interrupt
               167                                 ;EX1 = 0 - Initially disable INT1 (nREC)
               168                                 ;ET1 = 0 - Disable TIMER1 (BRG) interrupt
               169                                 ;ES  = 0 - Initially disable serial port interrupt
               170                                 ;ET2 = 0 - Disable TIMER2 interrupt
               171                                 ;X   = 0 - RESERVED
               172                                 ;EA  = 1 - Globally enable interrupts
               173
               174     INITIALIZE_STATUS_FLAGS:
0072 C202      175            CLR    FIRST_POS_RCVD   ;Set upon receipt of 1st valid non-zero position
0074 C203      176            CLR    NON_ZERO_POS     ;Set if non-zero position digit received
0076 C200      177            CLR    POS_UPDATED      ;Set by SERIAL_PORT_ISR on good sentence
0078 C204      178            CLR    LEAVE_LED_ON     ;Set to signal TIMER0 ISR not to turn off LED
007A D296      179            SETB   WD_RST
007C C296      180            CLR    WD_RST
```

```
                    181     INITIALIZE_GPS_RCVR:
007E 1205DC         182             CALL    DLY_P5S         ;Allow 0.5 seconds for GPS rcvr to initialize
0081 1205A4         183             CALL    INIT_GPS_RCVR   ;Send PMGLI message turning on GPGGA message
                    184     CHECK_FOR_RECORD_MODE:
0084 E580           185             MOV     A,P0            ;Mask target ID (bits 1-3 of P0)
0086 F4             186             CPL     A               ;Invert the target ID bits
0087 540E           187             ANL     A,#0Eh
0089 603F           188             JZ      POWER_UP_VRPD   ;Jump if VID = 0 (all-message recording)
                    189     ANNOUNCE_RESET:
008B 752C0A         190             MOV     I_P_TIMER,#GPS_TIME   ;Init timer at GPS rcvr grace period
                    191     GPS_WDT_TIMEOUT_LOOP:
008E E52C           192             MOV     A,I_P_TIMER
0090 B401FB         193             CJNE    A,#1,GPS_WDT_TIMEOUT_LOOP ;Transmit homing until last second
0093 C2B4           194             CLR     H_g             ;Switch to GPS transmission
0095 1205D3         195             CALL    DLY_P1S
0098 752914         196             MOV     MESSAGE,#14h    ;Play "RESET"
009B 1204AB         197             CALL    PLAY_MESSAGE
009E D2B4           198             SETB    H_g             ;Switch back to homing mode
00A0 752278         199             MOV     WDT,#I_P_TIME
00A3 1205E5         200             CALL    DLY_1S
00A6 1205E5         201             CALL    DLY_1S
00A9 1205E5         202             CALL    DLY_1S
                    203     CHECK_FOR_MESSAGE_TEST:
00AC 20B31B         204             JB      nREC,POWER_UP_VRPD ;Jump if RTU RECORD switch not pressed @pwr up
                    205     TEST_ALL_MESSAGES:
00AF C2B4           206             CLR     H_g             ;Gate voice modulation to transmitter
00B1 120574         207             CALL    XMTR_ON         ;Turn on transmitter
00B4 D2A7           208             SETB    P_r             ;Set for playback mode
00B6 752900         209             MOV     MESSAGE,#0      ;Clear message pointer
00B9 D204           210             SETB    LEAVE_LED_ON
                    211     TEST_MESSAGE_LOOP:
00BB 1204AB         212             CALL    PLAY_MESSAGE    ;Play selected message
00BE 0529           213             INC     MESSAGE         ;Increment message pointer
00C0 741B           214             MOV     A,#MESSAGE_MAX+1 ;Has MESSAGE incremented beyond its maximum?
00C2 B529F6         215             CJNE    A,MESSAGE,TEST_MESSAGE_LOOP ;Loop for next message if not
00C5 12046A         216             CALL    PLAY_USER_MESSAGE ;Finally play (direct) user message
00C8 80E2           217             JMP     CHECK_FOR_MESSAGE_TEST ;Loop if another test run is requested
                    218     POWER_UP_VRPD:
00CA 752278         219             MOV     WDT,#I_P_TIME
00CD D2A0           220             SETB    PD
00CF D2A5           221             SETB    nCEU2
00D1 D2A6           222             SETB    nCEU3
00D3 1205D3         223             CALL    DLY_P1S
00D6 C2A0           224             CLR     PD              ;Take VRPDs out of low-power mode & reset
00D8 C2A3           225             CLR     A0              ;Deselect VRPD cueing address mode
00DA C2A4           226             CLR     A4              ;Deselect VRPD consecutive address mode
                    227     FLASH_STATUS_LED:
00DC D204           228             SETB    LEAVE_LED_ON
00DE C290           229             CLR     nSTATUS         ;Turn on RTU STATUS LED for lamp test
00E0 1205DC         230             CALL    DLY_P5S
00E3 D290           231             SETB    nSTATUS         ;Terminate lamp test
                    232     CHECK_VEHICLE_ID:
00E5 E580           233             MOV     A,P0            ;Mask target ID (bits 1-3 of P0)
00E7 F4             234             CPL     A               ;Invert the target ID bits
00E8 540E           235             ANL     A,#0Eh
00EA 7011           236             JNZ     J_POWER_UP_XMTR ;Jump if VID <> 0 (no all-message recording)
00EC C2AA           237             CLR     EX1             ;Else disable nREC UDM interrupt
00EE 12049C         238             CALL    FLICKER_STATUS_LED
                    239     WRITE_PROTECT_CHECK:
00F1 30B30C         240             JNB     nREC,PREPARE_TO_RECORD ;ERASE_VRPDS Jump if REC key pressed
00F4 E580           241             MOV     A,P0            ;Mask target ID (bits 1-3 of P0)
00F6 F4             242             CPL     A               ;Invert the target ID bits
00F7 540E           243             ANL     A,#0Eh
00F9 7002           244             JNZ     J_POWER_UP_XMTR ;Jump if VID <> 0 (no all-message recording)
```

```
00FB 80F4        245           JMP     WRITE_PROTECT_CHECK    ;Else check again until user is sure
                 246   J_POWER_UP_XMTR:
00FD 02018F      247           JMP     POWER_UP_XMTR
                 248
                 249   PREPARE_TO_RECORD:
0100 D2A0        250           SETB    PD                     ;Reset VRPDs for recording
0102 C2A0        251           CLR     PD                     ;Re-enable VRPDs
0104 752523      252           MOV     MSEC,#PUD_TIME
0107 120560      253           CALL    DLY_MSEC
010A D2A4        254           SETB    A4                     ;Select VRPD consecutive address mode
010C C2A3        255           CLR     A0                     ;Deselect VRPD cueing address mode
010E C2A7        256           CLR     P_r                    ;Select VRPD record mode
0110 752900      257           MOV     MESSAGE,#0             ;Initialize message pointer
                 258   RECORD_U2_MESSAGES:
0113 75223C      259           MOV     WDT,#60                ;Allow 60 seconds for message recording
0116 20B3FD      260           JB      nREC,$                 ;Loop until RTU REC key pressed
0119 752564      261           MOV     MSEC,#100              ;Debounce for 100ms
011C 120560      262           CALL    DLY_MSEC
011F 20B3F1      263           JB      nREC,RECORD_U2_MESSAGES
0122 C2A5        264           CLR     nCEU2                  ;Begin recording of message
0124 C290        265           CLR     nSTATUS                ;Turn on RTU STATUS LED
                 266   RECORD_U2_LOOP:
0126 20B30A      267           JB      nREC,STOP_U2_RECORDING ;Loop until RTU REC key released
0129 2095FA      268           JB      nEOM_U2,RECORD_U2_LOOP ;Or until overflow (nEOM_U2 = 0)
                 269   U2_RECORD_OVERFLOW:
012C D2A5        270           SETB    nCEU2                  ;Deselect U2
012E 12049C      271           CALL    FLICKER_STATUS_LED     ;Warn operator to restart at "ZEE-RO"
0131 80CD        272           JMP     PREPARE_TO_RECORD
                 273   STOP_U2_RECORDING:
0133 D2A5        274           SETB    nCEU2                  ;End recording of message
0135 752511      275           MOV     MSEC,#EOM_TIME
0138 120560      276           CALL    DLY_MSEC
013B D290        277           SETB    nSTATUS                ;Turn off RTU STATUS LED
013D 0529        278           INC     MESSAGE                ;Increment message counter
013F E529        279           MOV     A,MESSAGE              ;A gets message pointer
0141 B411CF      280           CJNE    A,#11h,RECORD_U2_MESSAGES ;Loop back until ready to record VRPD U3
0144 1205DC      281           CALL    DLY_P5S                ;Else flicker RTU STATUS LED twice
0147 12049C      282           CALL    FLICKER_STATUS_LED
014A 1205DC      283           CALL    DLY_P5S
014D 12049C      284           CALL    FLICKER_STATUS_LED
                 285
                 286   RECORD_U3_MESSAGES:
0150 75223C      287           MOV     WDT,#60                ;Allow 60 seconds for message recording
0153 20B3FD      288           JB      nREC,$                 ;Loop until RTU REC key pressed
0156 752564      289           MOV     MSEC,#100              ;Debounce for 100ms
0159 120560      290           CALL    DLY_MSEC
015C 20B3F1      291           JB      nREC,RECORD_U3_MESSAGES
015F C2A6        292           CLR     nCEU3                  ;Begin recording of message
0161 C290        293           CLR     nSTATUS                ;Turn on RTU STATUS LED
                 294   RECORD_U3_LOOP:
0163 20B30A      295           JB      nREC,STOP_U3_RECORDING ;Loop until RTU REC key released
0166 2094FA      296           JB      nEOM_U3,RECORD_U3_LOOP ;Or until overflow (nEOM_U3 = 0)
                 297   U3_RECORD_OVERFLOW:
0169 D2A6        298           SETB    nCEU3                  ;Deselect U3
016B 12049C      299           CALL    FLICKER_STATUS_LED     ;Warn operator to restart at "ZEE-RO"
016E 8090        300           JMP     PREPARE_TO_RECORD
                 301   STOP_U3_RECORDING:
0170 D2A6        302           SETB    nCEU3                  ;End recording of message
0172 D290        303           SETB    nSTATUS                ;Turn off RTU STATUS LED
0174 0529        304           INC     MESSAGE                ;Increment message counter
0176 E529        305           MOV     A,MESSAGE              ;A gets message pointer
0178 B41BD5      306           CJNE    A,#MESSAGE_MAX+1,RECORD_U3_MESSAGES ;Loop until VRPDs recorded
017B 1205DC      307           CALL    DLY_P5S                ;Else flicker RTU STATUS LED three times
017E 12049C      308           CALL    FLICKER_STATUS_LED
```

```
0181 1205DC     309             CALL    DLY_P5S
0184 12049C     310             CALL    FLICKER_STATUS_LED
0187 1205DC     311             CALL    DLY_P5S
018A 12049C     312             CALL    FLICKER_STATUS_LED
018D 01AF       313             JMP     TEST_ALL_MESSAGES
                314     POWER_UP_XMTR:
018F C2B4       315             CLR     H_g                         ;Gate GPS audio to XMTR modulation
0191 120574     316             CALL    XMTR_ON                     ;Ensure xmtr relay latched on at reset
0194 D2A7       317             SETB    P_r                         ;Select VRPD playback mode
                318
                319     INIT_INTER_POS_TIMER:
0196 752C78     320             MOV     I_P_TIMER,#I_P_TIME         ;Initialize inter-position timer
                321     SEND_ALERT_TONE:
0199 752915     322             MOV     MESSAGE,#15h                ;Transmit alert tones
019C 1204AB     323             CALL    PLAY_MESSAGE
                324
                325     SEND_VEHICLE_ID:
019F 75290E     326             MOV     MESSAGE,#0Eh                ;Transmit "TARGET"
01A2 1204AB     327             CALL    PLAY_MESSAGE
01A5 C200       328             CLR     POS_UPDATED                 ;Ensure POS_UPDATED is reset for next 30 sec.
01A7 E580       329             MOV     A,P0                        ;Read target ID (bits 1-3 of P0)
01A9 03         330             RR      A                           ;Vehicle ID -> LS 3 bits of ACC
01AA F4         331             CPL     A                           ;Complement inverted input of BCD switch
01AB 5407       332             ANL     A,#7h                       ;Mask off VID number
01AD F529       333             MOV     MESSAGE,A
01AF 1204AB     334             CALL    PLAY_MESSAGE
                335     CHECK_GPS_STATUS:
01B2 200212     336             JB      FIRST_POS_RCVD,SEND_POSITION ;Jump if valid, non-zero GPS pos received
01B5 752916     337             MOV     MESSAGE,#16h                ;Transmit "NO GPS"
01B8 1204AB     338             CALL    PLAY_MESSAGE
01BB 752913     339             MOV     MESSAGE,#13h                ;Transmit "POSITION"
01BE 1204AB     340             CALL    PLAY_MESSAGE
01C1 1205E5     341             CALL    DLY_1S                      ;Pause
01C4 020235     342             JMP     SEND_A_B
                343     SEND_POSITION:
01C7 200006     344             JB      POS_UPDATED,SEND_NEW_POSITION ;Jump if pos updated since last xmission
01CA 752910     345             MOV     MESSAGE,#10h                ;Else transmit "LAST"
01CD 1204AB     346             CALL    PLAY_MESSAGE
                347     SEND_NEW_POSITION:
01D0 752913     348             MOV     MESSAGE,#13h                ;Transmit "POSITION"
01D3 1204AB     349             CALL    PLAY_MESSAGE
01D6 1205DC     350             CALL    DLY_P5S                     ;Pause
01D9 7841       351             MOV     R0,#TBUF_START              ;Init pointer to start of xmit buffer
01DB 7C02       352             MOV     R4,#2                       ;Transmit #degrees latitude
01DD 1205EE     353             CALL    PLAY_R4_TBUF_DIGITS
01E0 752919     354             MOV     MESSAGE,#19h                ;Transmit "DEGREES"
01E3 1204AB     355             CALL    PLAY_MESSAGE
01E6 7C02       356             MOV     R4,#2                       ;Transmit whole minutes latitude
01E8 1205EE     357             CALL    PLAY_R4_TBUF_DIGITS
01EB 75290F     358             MOV     MESSAGE,#0Fh                ;Transmit "POINT"
01EE 1204AB     359             CALL    PLAY_MESSAGE
01F1 7C02       360             MOV     R4,#2                       ;Transmit hundredths of minutes latitude
01F3 1205EE     361             CALL    PLAY_R4_TBUF_DIGITS
01F6 75291A     362             MOV     MESSAGE,#1Ah                ;Transmit "MINUTES"
01F9 1204AB     363             CALL    PLAY_MESSAGE
01FC 1205FA     364             CALL    PLAY_TBUF_DIR               ;Transmit (N)orth or (S)outh
01FF 752912     365             MOV     MESSAGE,#12h                ;Transmit "LATITUDE"
0202 1204AB     366             CALL    PLAY_MESSAGE
0205 1205E5     367             CALL    DLY_1S                      ;Pause after transmitting latitude
0208 7C03       368             MOV     R4,#3                       ;Transmit #degrees longitude
020A 1205EE     369             CALL    PLAY_R4_TBUF_DIGITS
020D 752919     370             MOV     MESSAGE,#19h                ;Transmit "DEGREES"
0210 1204AB     371             CALL    PLAY_MESSAGE
0213 7C02       372             MOV     R4,#2                       ;Transmit whole minutes longiitude
```

```
0215 1205EE      373            CALL    PLAY_R4_TBUF_DIGITS
0218 75290F      374            MOV     MESSAGE,#0Fh         ;Transmit "POINT"
021B 1204AB      375            CALL    PLAY_MESSAGE
021E 7C02        376            MOV     R4,#2                ;Transmit hundredths of minutes longitude
0220 1205EE      377            CALL    PLAY_R4_TBUF_DIGITS
0223 75291A      378            MOV     MESSAGE,#1Ah         ;Transmit "MINUTES"
0226 1204AB      379            CALL    PLAY_MESSAGE
0229 1205FA      380            CALL    PLAY_TBUF_DIR        ;Transmit (E)ast or (W)est
022C 752911      381            MOV     MESSAGE,#11h         ;Transmit "LONGITUDE"
022F 1204AB      382            CALL    PLAY_MESSAGE
0232 1205E5      383            CALL    DLY_1S               ;Pause after transmitting longitude
                 384    SEND_A_B:
0235 752917      385            MOV     MESSAGE,#17h         ;Transmit "A IS"
0238 1204AB      386            CALL    PLAY_MESSAGE
023B 752900      387            MOV     MESSAGE,#0h          ;Assume nSIGA is high -> Transmit "ZEE-RO"
023E 20A103      388            JB      nSIGA,SEND_A
0241 752901      389            MOV     MESSAGE,#1h          ;Else nSIGA is low -> Transmit "ONE"
                 390    SEND_A:
0244 1204AB      391            CALL    PLAY_MESSAGE
0247 1205DC      392            CALL    DLY_P5S              ;Pause
024A 752918      393            MOV     MESSAGE,#18h         ;Transmit "B IS"
024D 1204AB      394            CALL    PLAY_MESSAGE
0250 752900      395            MOV     MESSAGE,#0h          ;Assume nSIGB is high -> Transmit "ZEE-RO"
0253 20A203      396            JB      nSIGB,SEND_B
0256 752901      397            MOV     MESSAGE,#1h          ;Else nSIGB is low -> Transmit "ONE"
                 398    SEND_B:
0259 1204AB      399            CALL    PLAY_MESSAGE
025C 1205DC      400            CALL    DLY_P5S              ;Pause
                 401    SEND_UDM:
025F 12046A      402            CALL    PLAY_USER_MESSAGE    ;Transmit user-defined message
                 403    POWER_DOWN_VRPD:
0262 D2A0        404            SETB    PD                   ;Finished with VRPDs so power them down
0264 C204        405            CLR     LEAVE_LED_ON
                 406    ENABLE_RECORD_INT1:
0266 C28A        407            CLR     IT1                  ;Clear pending INT1 (nREC) interrupt
0268 D2AA        408            SETB    EX1                  ;Enable INT1 for future user message recording
026A 752278      409            MOV     WDT,#I_P_TIME        ;Initialize Watch Dog Timer
                 410    CHECK_GPSO:
026D 208009      411            JB      nGPSO,ENABLE_HOMING  ;Jump if Homing mode requested
                 412    GPS_ONLY:
0270 12058F      413            CALL    XMTR_OFF             ;Else conserve power by powering down transmitter
                 414    POWER_DOWN_8751:
0273 758701      415            MOV     PCON,#1h             ;Set IDL bit (CPU stops. Idle stops on interrupt)
                 416    RESUME_MAIN_LOOP:
0276 02027B      417            JMP     CHECK_I_P_TIMER      ;Main loop resumes here following any ISR
                 418    ENABLE_HOMING:
0279 D2B4        419            SETB    H_g                  ;Gate homing modulation to xmtr
                 420    CHECK_I_P_TIMER:
027B 7478        421            MOV     A,#I_P_TIME          ;A = #seconds between GPS position transmissions
027D C2D7        422            CLR     CY                   ;Clear borrow flag
027F 952C        423            SUBB    A,I_P_TIMER          ;Subtract I_P_TIMER (1Hz) count from I_P_TIME
0281 4002        424            JC      J_POWER_UP_VRPD      ;Loop back to begining if I_P_TIMER underflowed
0283 80EE        425            JMP     POWER_DOWN_8751      ;Else power down 8751 until next interrupt
                 426    J_POWER_UP_VRPD:
0285 01CA        427            JMP     POWER_UP_VRPD        ;POWER_UP_VRPD address outside JC relative range
                 428
                 429    ;IIIIIIIIIIIIIIIIIIIIIIIIIIIIIIIIIIIIIIIIIIIIIIIIIIIIIIIIIIIIIIIIIIII
                 430
                 431    ;                                    INTERRUPT SERVICE ROUTINES
                 432
                 433    ;IIIIIIIIIIIIIIIIIIIIIIIIIIIIIIIIIIIIIIIIIIIIIIIIIIIIIIIIIIIIIIIIIIII
                 434    ;IIIIIIIIIIIIIIIIIIIIIIIIIIIIIIIIIIIIIIIIIIIIIIIIIIIIIIIIIIIIIIIIIIII
                 435
                 436    ;                                    INT0_ISR (1 Hz)
```

```
                    437     ;IIIIIIIIIIIIIIIIIIIIIIIIIIIIIIIIIIIIIIIIIIIIIIIIIIIIIIIIIIIIIIIIIIIIIIIII
                    438     INT0_ISR:
0287 C0D0           439         PUSH    PSW                     ;Save status word
0289 152C           440         DEC     I_P_TIMER               ;Count down inter-position timer
028B D0D0           441         POP     PSW                     ;Restore status word
028D 32             442         RETI
                    443
                    444     ;IIIIIIIIIIIIIIIIIIIIIIIIIIIIIIIIIIIIIIIIIIIIIIIIIIIIIIIIIIIIIIIIIIIIIIIII
                    445     ;IIIIIIIIIIIIIIIIIIIIIIIIIIIIIIIIIIIIIIIIIIIIIIIIIIIIIIIIIIIIIIIIIIIIIIIII
                    446
                    447     ;                                   INT1_ISR (RTU Record User Message)
                    448     ;IIIIIIIIIIIIIIIIIIIIIIIIIIIIIIIIIIIIIIIIIIIIIIIIIIIIIIIIIIIIIIIIIIIIIIIII
                    449     INT1_ISR:
028E C2AA           450         CLR     EX1                     ;Disable subsequent interrupts from contact bounce
0290 C0E0           451         PUSH    ACC                     ;Save used registers
0292 C0D0           452         PUSH    PSW
0294 75D010         453         MOV     PSW,#10h                ;Select register bank 2
                    454     PU_VRPD_FOR_UDM:
0297 C2A0           455         CLR     PD                      ;Power up VRPDs (U3) for user message
0299 752564         456         MOV     MSEC,#100               ;Debounce/PUD_TIME = 100ms
029C 120560         457         CALL    DLY_MSEC
029F C2A7           458         CLR     P_r                     ;Select VRPD record mode
02A1 C291           459         CLR     F_u                     ;Select direct address for user message
02A3 D2A3           460         SETB    A0
02A5 D2A4           461         SETB    A4
02A7 C2A6           462         CLR     nCEU3                   ;Else latch address and begin recording
02A9 C290           463         CLR     nSTATUS                 ;Turn on RTU STATUS LED
02AB D204           464         SETB    LEAVE_LED_ON
                    465     CHECK_OVERFLOW_LOOP:
02AD 20B303         466         JB      nREC,END_USER_MESSAGE_RECORDING ;Loop until RTU REC key released
02B0 2094FA         467         JB      nEOM_U3,CHECK_OVERFLOW_LOOP ;...or until U3's EOM is asserted
                    468     END_USER_MESSAGE_RECORDING:
02B3 D2A6           469         SETB    nCEU3                   ;End recording of message
02B5 D290           470         SETB    nSTATUS                 ;Turn off RTU STATUS LED
02B7 C204           471         CLR     LEAVE_LED_ON
02B9 30B3FD         472         JNB     nREC,$                  ;Loop until RTU REC key released
02BC 752511         473         MOV     MSEC,#EOM_TIME
02BF 120560         474         CALL    DLY_MSEC
02C2 D2A0           475         SETB    PD                      ;Power down VRPDs
02C4 12046A         476         CALL    PLAY_USER_MESSAGE       ;Then playback recorded user message
02C7 D291           477         SETB    F_u                     ;Re-select fixed VRPD addresses
02C9 D0D0           478         POP     PSW                     ;Restore used registers
02CB D0E0           479         POP     ACC
02CD C28B           480         CLR     IE1                     ;Clear any pending nREC INT1
02CF D2AA           481         SETB    EX1                     ;Renable INT1
02D1 32             482         RETI
                    483
                    484     ;IIIIIIIIIIIIIIIIIIIIIIIIIIIIIIIIIIIIIIIIIIIIIIIIIIIIIIIIIIIIIIIIIIIIIIIII
                    485     ;IIIIIIIIIIIIIIIIIIIIIIIIIIIIIIIIIIIIIIIIIIIIIIIIIIIIIIIIIIIIIIIIIIIIIIIII
                    486
                    487     ;                                   TIMER0_ISR
                    488     ;IIIIIIIIIIIIIIIIIIIIIIIIIIIIIIIIIIIIIIIIIIIIIIIIIIIIIIIIIIIIIIIIIIIIIIIII
                    489     TIMER0_ISR:
02D2 C0E0           490         PUSH    ACC                     ;Save accumulator
02D4 C0D0           491         PUSH    PSW                     ;Save status word
02D6 C28C           492         CLR     TR0                     ;Stop TIMER0
02D8 758CFC         493         MOV     TH0,#P001_SEC_HI        ;Renitialize TIMER0 counter registers @ 1ms
02DB 758A66         494         MOV     TL0,#P001_SEC_LO
02DE D28C           495         SETB    TR0                     ;Enable TIMER0
                    496     CHECK_STATUS_LED:
02E0 300406         497         JNB     LEAVE_LED_ON,CHECK_STATUS_LED_TICK
02E3 752700         498         MOV     STATUS_LED_TICK,#0
02E6 0202F2         499         JMP     CHECK_REL_TIMERS
                    500     CHECK_STATUS_LED_TICK:
```

```
02E9 E527        501           MOV    A,STATUS_LED_TICK
02EB 6005        502           JZ     CHECK_REL_TIMERS       ;Jump if STATUS_LED_TICK already zero
02ED D52702      503           DJNZ   STATUS_LED_TICK,CHECK_REL_TIMERS ;Else decrement STATUS_LED_TICK
02F0 D290        504           SETB   nSTATUS                ;And turn off STATUS LED if TICK = 0
                 505   CHECK_REL_TIMERS:
02F2 0526        506           INC    ONE_MS_TICK            ;Externally-changeable relative 1ms timer counter
02F4 0528        507           INC    PRE_TICK               ;Non-externally changeable  "       "    "    "
02F6 E528        508           MOV    A,PRE_TICK
02F8 C2D7        509           CLR    CY
02FA 9432        510           SUBB   A,#50
02FC 4042        511           JC     RETURN_FROM_TIMER0_ISR ;Jump if PRE_TICK < 50
02FE 0510        512           INC    TICK                   ;Else increment relative 50ms timer counter
0300 752800      513           MOV    PRE_TICK,#0            ;And reset PRE_TICK
0303 0524        514           INC    FIFTY_MS               ;Else increment WDT 50ms counter
0305 7414        515           MOV    A,#20
0307 C2D7        516           CLR    CY
0309 9524        517           SUBB   A,FIFTY_MS
030B 5006        518           JNC    CHECK_WDT              ;Jump if FIFTY_MS <=20
030D 752400      519           MOV    FIFTY_MS,#0            ;Else reset FIFTY_MS counter
0310 020340      520           JMP    RETURN_FROM_TIMER0_ISR ;And our job is done
                 521   CHECK_WDT:
0313 E523        522           MOV    A,SS_WDT               ;Pre-check Serial Set Watch Dog Timer
0315 6014        523           JZ     CHECK_FOR_500MS        ;Do not set WD_RST if SS_WDT timed out
                 524   CHECK_FOR_300MS:
0317 E524        525           MOV    A,FIFTY_MS
0319 B40605      526           CJNE   A,#6,CHECK_FOR_700MS   ;Jump if not at 0.3 seconds
031C D296        527           SETB   WD_RST                 ;Else set WD_RST
031E 020340      528           JMP    RETURN_FROM_TIMER0_ISR ;And our job is done
                 529   CHECK_FOR_700MS:
0321 B40E07      530           CJNE   A,#14,CHECK_FOR_500MS  ;Jump if not at 0.7 seconds
0324 D296        531           SETB   WD_RST                 ;Else set WD_RST
0326 1523        532           DEC    SS_WDT                 ;Decrement Serial Set Watch Dog Timer
0328 020340      533           JMP    RETURN_FROM_TIMER0_ISR ;And our job is done
                 534   CHECK_FOR_500MS:
032B E522        535           MOV    A,WDT                  ;Pre-check main program Watch Dog Timer
032D 6011        536           JZ     RETURN_FROM_TIMER0_ISR ;Do not reset WD_RST if WDT timed out
032F E524        537           MOV    A,FIFTY_MS
0331 B40A05      538           CJNE   A,#10,CHECK_FOR_1000MS ;Jump if not at 0.5 seconds
0334 C296        539           CLR    WD_RST                 ;Else reset WD_RST
0336 020340      540           JMP    RETURN_FROM_TIMER0_ISR ;And our job is done
                 541   CHECK_FOR_1000MS:
0339 B41404      542           CJNE   A,#20,RETURN_FROM_TIMER0_ISR  ;Jump if not at one second
033C C296        543           CLR    WD_RST                 ;Else output falling edge to MAX 690
033E 1522        544           DEC    WDT                    ;Decrement Watch Dog Timer
                 545   RETURN_FROM_TIMER0_ISR:
0340 D0D0        546           POP    PSW                    ;Restore status word
0342 D0E0        547           POP    ACC                    ;Restore accumulator
0344 32          548           RETI                          ;And return
                 549
                 550   ;IIIIIIIIIIIIIIIIIIIIIIIIIIIIIIIIIIIIIIIIIIIIIIIIIIIIIIIIIIIIIIIIIIIIIIII
                 551   ;
                 552   ;                              SERIAL_PORT_ISR
                 553   ;IIIIIIIIIIIIIIIIIIIIIIIIIIIIIIIIIIIIIIIIIIIIIIIIIIIIIIIIIIIIIIIIIIIIIIII
                 554   SERIAL_PORT_ISR:
0345 C0D0        555           PUSH   PSW                    ;Save register bank 0 (used by all other code)
0347 C0E0        556           PUSH   ACC
0349 75D008      557           MOV    PSW,#08h               ;Clear flags and select register bank 1
034C E599        558           MOV    A,SBUF                 ;Read serial port receive register
034E F52D        559           MOV    RCHAR,A                ;Save received character
0350 C298        560           CLR    RI                     ;Reset serial port interrupt flag
0352 209A07      561           JB     RB8,STOP_BIT_OK  ;Jump if stop bit (bit #10) = 1
0355 D201        562           SETB   STOP_BIT_ERROR   ;Else indicate data may be erroneous
0357 D0E0        563           POP    ACC
0359 D0D0        564           POP    PSW
```

```
035B 32          565            RETI                           ;And return
                 566     STOP_BIT_OK:
035C B42414      567            CJNE    A,#'$',LOOK_UP_RESPONSE ;Jump if nop starting new sentence
035F 753132      568            MOV     RBUF_PTR,#RBUF_START    ;Else reset pointers, counters, & flags
0362 752F00      569            MOV     RCHAR_CTR,#0
0365 752E00      570            MOV     CHECKSUM,#0
0368 C201        571            CLR     STOP_BIT_ERROR
036A C200        572            CLR     POS_UPDATED
036C C203        573            CLR     NON_ZERO_POS
036E D0E0        574            POP     ACC
0370 D0D0        575            POP     PSW
0372 32          576            RETI                            ;And return
                 577     LOOK_UP_RESPONSE:
0373 052F        578            INC     RCHAR_CTR               ;Increment index of received characters
0375 E52F        579            MOV     A,RCHAR_CTR             ;Make sure no more than 59 characters received
0377 C3          580            CLR     C
0378 943C        581            SUBB    A,#60
037A 4005        582            JC      RCHAR_CTR_OK            ;Jump if less than 60 characters received
037C D0E0        583            POP     ACC
037E D0D0        584            POP     PSW
0380 32          585            RETI                            ;Else return
                 586     RCHAR_CTR_OK:
0381 E52F        587            MOV     A,RCHAR_CTR             ;Look up response code indexed by RCHAR_CTR
0383 2402        588            ADD     A,#2                    ;Offset PC value by 3 (RCHAR_CTR was already
0385 83          589            MOVC    A,@A+PC                 ;incremented above) to begin table after LJMP
0386 0203C4      590            LJMP    RESPOND                 ;Long Jump (3 bytes) after getting response code
                 591     RESPONSE_TABLE:
0389 00          592                    DB      0       ; 1, G
038A 01          593                    DB      1       ; 2, P
038B 01          594                    DB      1       ; 3, G
038C 01          595                    DB      1       ; 4, G
038D 01          596                    DB      1       ; 5, A
038E 01          597                    DB      1       ; 6, ,
038F 02          598                    DB      2       ; 7, UTC hours (tens)
0390 02          599                    DB      2       ; 8,  "    "   (units)
0391 02          600                    DB      2       ; 9,  "  minutes (tens)
0392 02          601                    DB      2       ;10,  "    "   (units)
0393 02          602                    DB      2       ;11,  "  seconds (tens)
0394 02          603                    DB      2       ;12,  "    "   (units)
0395 01          604                    DB      1       ;13, ,
0396 03          605                    DB      3       ;14, RBUF_LAT_10D
0397 03          606                    DB      3       ;15, RBUF_LAT_D
0398 03          607                    DB      3       ;16, RBUF_LAT_10M
0399 03          608                    DB      3       ;17, RBUF_LAT_M
039A 01          609                    DB      1       ;18, .
039B 03          610                    DB      3       ;19, RBUF_LAT_P1M
039C 03          611                    DB      3       ;20, RBUF_LAT_P01M
039D 01          612                    DB      1       ;21, ,
039E 04          613                    DB      4       ;22, RBUF_LAT_DIR
039F 01          614                    DB      1       ;23, ,
03A0 03          615                    DB      3       ;24, RBUF_LONG_100D
03A1 03          616                    DB      3       ;25, RBUF_LONG_10D
03A2 03          617                    DB      3       ;26, RBUF_LONG_D
03A3 03          618                    DB      3       ;27, RBUF_LONG_10M
03A4 03          619                    DB      3       ;28, RBUF_LONG_M
03A5 01          620                    DB      1       ;29, .
03A6 03          621                    DB      3       ;30, RBUF_LONG_P1M
03A7 03          622                    DB      3       ;31, RBUF_LONG_P01M
03A8 01          623                    DB      1       ;32, ,
03A9 04          624                    DB      4       ;33, RBUF_LONG_DIR
03AA 01          625                    DB      1       ;34, ,
03AB 01          626                    DB      1       ;35, GPS Availability
03AC 01          627                    DB      1       ;36, ,
03AD 01          628                    DB      1       ;37, No. of Satellites Used
```

```
03AE 01         629                 DB      1       ;38, ,
03AF 01         630                 DB      1       ;39, HDOP
03B0 01         631                 DB      1       ;40, HDOP
03B1 01         632                 DB      1       ;41, HDOP
03B2 01         633                 DB      1       ;42, ,
03B3 01         634                 DB      1       ;43, Antenna Height
03B4 01         635                 DB      1       ;44, Antenna Height
03B5 01         636                 DB      1       ;45, Antenna Height
03B6 01         637                 DB      1       ;46, ,
03B7 01         638                 DB      1       ;47, M(eters)
03B8 01         639                 DB      1       ;48, ,
03B9 01         640                 DB      1       ;49, Sense of Geoidal Height
03BA 01         641                 DB      1       ;50, Geoidal Height
03BB 01         642                 DB      1       ;51, Geoidal Height
03BC 01         643                 DB      1       ;52, Geoidal Height
03BD 01         644                 DB      1       ;53, ,
03BE 01         645                 DB      1       ;54, M(eters)
03BF 05         646                 DB      5       ;55, *
03C0 06         647                 DB      6       ;56, CHECKSUM tens
03C1 07         648                 DB      7       ;57, CHECKSUM units
03C2 05         649                 DB      5       ;58, CR (0Dh)
03C3 05         650                 DB      5       ;59, LF (0Ah)
                651
                652     RESPOND:
03C4 B40008     653             CJNE    A,#0,RESPOND_TO_1       ;Jump if response code <> 0
03C7 852D2E     654             MOV     CHECKSUM,RCHAR  ;Else character is first in CHECKSUM
03CA D0E0       655             POP     ACC
03CC D0D0       656             POP     PSW
03CE 32         657             RETI
                658     RESPOND_TO_1:
03CF B4010B     659             CJNE    A,#1,RESPOND_TO_2       ;Jump if response code <> 1
03D2 E52E       660             MOV     A,CHECKSUM              ;Else character is XOR'd with CHECKSUM
03D4 652D       661             XRL     A,RCHAR
03D6 F52E       662             MOV     CHECKSUM,A
03D8 D0E0       663             POP     ACC
03DA D0D0       664             POP     PSW
03DC 32         665             RETI
                666     RESPOND_TO_2:                   ;(SAME AS RESPOND_TO_1)
03DD B4020B     667             CJNE    A,#2,RESPOND_TO_3       ;Jump if response code <> 2
03E0 E52E       668             MOV     A,CHECKSUM              ;Else character is XOR'd with CHECKSUM
03E2 652D       669             XRL     A,RCHAR
03E4 F52E       670             MOV     CHECKSUM,A
03E6 D0E0       671             POP     ACC
03E8 D0D0       672             POP     PSW
03EA 32         673             RETI
                674     RESPOND_TO_3:
03EB B4031B     675             CJNE    A,#3,RESPOND_TO_4       ;Jump if response code <> 3
03EE E52E       676             MOV     A,CHECKSUM              ;Else character is XOR'd with CHECKSUM
03F0 652D       677             XRL     A,RCHAR
03F2 F52E       678             MOV     CHECKSUM,A
03F4 A831       679             MOV     R0,RBUF_PTR             ;And copy RCHAR into RBUF
03F6 A62D       680             MOV     @R0,RCHAR
03F8 0531       681             INC     RBUF_PTR                ;Then point to next RBUF location
03FA E52D       682             MOV     A,RCHAR                 ;Check received character (='0'?)
03FC C2D7       683             CLR     CY                      ;Clear borrow flag
03FE 9430       684             SUBB    A,#'0'
0400 6002       685             JZ      RCHAR_EQ_0              ;Jump if position digit = '0'
0402 D203       686             SETB    NON_ZERO_POS            ;Else indicate a non-zero GPS pos digit received
                687     RCHAR_EQ_0:
0404 D0E0       688             POP     ACC
0406 D0D0       689             POP     PSW
0408 32         690             RETI
                691     RESPOND_TO_4:
0409 B40411     692             CJNE    A,#4,RESPOND_TO_5       ;Jump if response code <> 4
```

```
040C E52E        693             MOV     A,CHECKSUM              ;Else character is XOR'd with CHECKSUM
040E 652D        694             XRL     A,RCHAR
0410 F52E        695             MOV     CHECKSUM,A
0412 A831        696             MOV     R0,RBUF_PTR             ;And copy RCHAR into RBUF
0414 A62D        697             MOV     @R0,RCHAR
0416 0531        698             INC     RBUF_PTR                ;Then point to next RBUF location
0418 D0E0        699             POP     ACC
041A D0D0        700             POP     PSW
041C 32          701             RETI
                 702     RESPOND_TO_5:
041D B40505      703             CJNE    A,#5,RESPOND_TO_6       ;Jump if response code <> 5
0420 D0E0        704             POP     ACC
0422 D0D0        705             POP     PSW
0424 32          706             RETI                            ;Else ignore '*', CR, and LF characters
                 707     RESPOND_TO_6:
0425 B4060A      708             CJNE    A,#6,RESPOND_TO_7       ;Jump if response code <> 6
0428 12061D      709             CALL    ASCII_TO_REAL   ;Else convert ASCII checksum tens
042B C4          710             SWAP    A                       ;MSN -> left
042C F9          711             MOV     R1,A                    ;Save for next serial port interrupt
042D D0E0        712             POP     ACC
042F D0D0        713             POP     PSW
0431 32          714             RETI
                 715     RESPOND_TO_7:
0432 12061D      716             CALL    ASCII_TO_REAL   ;Convert ASCII checksum units
0435 49          717             ORL     A,R1                    ;Mask LSN into checksum
0436 B52E24      718             CJNE    A,CHECKSUM,DO_NOT_TRANSFER ;Jump if rcvd and calc checksum not =
0439 200121      719             JB      STOP_BIT_ERROR,DO_NOT_TRANSFER
                 720     TRANSFER:
043C 7832        721             MOV     R0,#RBUF_START  ;Copy RBUF to TBUF
043E 7941        722             MOV     R1,#TBUF_START
0440 7A0E        723             MOV     R2,#BUF_LENGTH
                 724     TRANSFER_LOOP:
0442 E6          725             MOV     A,@R0
0443 F7          726             MOV     @R1,A
0444 08          727             INC     R0
0445 09          728             INC     R1
0446 DAFA        729             DJNZ    R2,TRANSFER_LOOP
0448 D200        730             SETB    POS_UPDATED             ;Indicate that a valid GPGGA message was rcvd
044A 75230A      731             MOV     SS_WDT,#GPS_TIME        ;and reinit timer
044D 30030D      732             JNB     NON_ZERO_POS,DO_NOT_TRANSFER ;Jump if no non-zero pos digits rcvd
0450 D202        733             SETB    FIRST_POS_RCVD  ;Tell main loop to start transmitting position
0452 200410      734             JB      LEAVE_LED_ON,RETURN_FROM_SERIAL_ISR ;Jump if RTU STATUS LED already on
                 735     GOOD_POSITION_STATUS:
0455 C290        736             CLR     nSTATUS                 ;Else turn on RTU STATUS LED
0457 7527C8      737             MOV     STATUS_LED_TICK,#200    ;Init TIMER0 ISR counter for 200ms
045A 020465      738             JMP     RETURN_FROM_SERIAL_ISR
                 739     DO_NOT_TRANSFER:
045D 200405      740             JB      LEAVE_LED_ON,RETURN_FROM_SERIAL_ISR ;Jump if RTU STATUS LED already on
                 741     NO_POSITION_STATUS:
0460 C290        742             CLR     nSTATUS                 ;Else turn on RTU STATUS LED
0462 752732      743             MOV     STATUS_LED_TICK,#50     ;Init TIMER0 ISR counter for 50ms
                 744     RETURN_FROM_SERIAL_ISR:
0465 D0E0        745             POP     ACC
0467 D0D0        746             POP     PSW                     ;Restore PSW
0469 32          747             RETI
                 748
                 749     ;SSSSSSSSSSSSSSSSSSSSSSSSSSSSSSSSSSSSSSSSSSSSSSSSSSSSSSSSSSSSSSSSSSSSSS
                 750
                 751     ;                                       SUBROUTINES
                 752
                 753     ;SSSSSSSSSSSSSSSSSSSSSSSSSSSSSSSSSSSSSSSSSSSSSSSSSSSSSSSSSSSSSSSSSSSSSS
                 754     ;SSSSSSSSSSSSSSSSSSSSSSSSSSSSSSSSSSSSSSSSSSSSSSSSSSSSSSSSSSSSSSSSSSSSSS
                 755
                 756     ;                                       PLAY_USER_MESSAGE
```

```
                    757         ;SSSSSSSSSSSSSSSSSSSSSSSSSSSSSSSSSSSSSSSSSSSSSSSSSSSSSSSSSSSSSSSSSSSSS
                    758         PLAY_USER_MESSAGE:
046A C0E0           759                 PUSH    ACC                     ;Save used registers
046C C0D0           760                 PUSH    PSW
                    761         PU_VRPD_FOR_UDM_PLAYBACK:
046E C2A0           762                 CLR     PD                      ;Power up VRPDs (U3) for user message
0470 752523         763                 MOV     MSEC,#PUD_TIME
0473 120560         764                 CALL    DLY_MSEC
0476 D2A7           765                 SETB    P_r                     ;Select VRPD playback mode
0478 C291           766                 CLR     F_u                     ;Select direct address for user message
047A D2A3           767                 SETB    A0
047C D2A4           768                 SETB    A4
047E C2A6           769                 CLR     nCEU3                   ;Else latch address and begin playback
0480 D2A6           770                 SETB    nCEU3
0482 D204           771                 SETB    LEAVE_LED_ON
0484 C290           772                 CLR     nSTATUS                 ;Turn on RTU STATUS LED
0486 2094FD         773                 JB      nEOM_U3,$               ;Loop until U3's EOM is asserted
0489 752511         774                 MOV     MSEC,#EOM_TIME          ;Wait until end of message
048C 120560         775                 CALL    DLY_MSEC
                    776         END_USER_MESSAGE_PLAYBACK:
048F D290           777                 SETB    nSTATUS                 ;Turn off RTU STATUS LED
0491 C204           778                 CLR     LEAVE_LED_ON
0493 D291           779                 SETB    F_u                     ;Re-select fixed VRPD addresses
0495 D2A0           780                 SETB    PD                      ;Power down VRPDs
0497 D0D0           781                 POP     PSW                     ;Restore used registers
0499 D0E0           782                 POP     ACC
049B 22             783                 RET
                    784
                    785         ;SSSSSSSSSSSSSSSSSSSSSSSSSSSSSSSSSSSSSSSSSSSSSSSSSSSSSSSSSSSSSSSSSSSSS
                    786         ;SSSSSSSSSSSSSSSSSSSSSSSSSSSSSSSSSSSSSSSSSSSSSSSSSSSSSSSSSSSSSSSSSSSSS
                    787
                    788         ;                                       FLICKER_STATUS_LED
                    789         ;SSSSSSSSSSSSSSSSSSSSSSSSSSSSSSSSSSSSSSSSSSSSSSSSSSSSSSSSSSSSSSSSSSSSS
                    790         FLICKER_STATUS_LED:
049C 7E03           791                 MOV     R6,#3
                    792         FLICKER_LOOP:
049E C290           793                 CLR     nSTATUS
04A0 1205D3         794                 CALL    DLY_P1S
04A3 D290           795                 SETB    nSTATUS
04A5 1205D3         796                 CALL    DLY_P1S
04A8 DEF4           797                 DJNZ    R6,FLICKER_LOOP
04AA 22             798                 RET
                    799
                    800         ;SSSSSSSSSSSSSSSSSSSSSSSSSSSSSSSSSSSSSSSSSSSSSSSSSSSSSSSSSSSSSSSSSSSSS
                    801         ;SSSSSSSSSSSSSSSSSSSSSSSSSSSSSSSSSSSSSSSSSSSSSSSSSSSSSSSSSSSSSSSSSSSSS
                    802
                    803         ;                                       PLAY_MESSAGE
                    804         ;SSSSSSSSSSSSSSSSSSSSSSSSSSSSSSSSSSSSSSSSSSSSSSSSSSSSSSSSSSSSSSSSSSSSS
                    805         PLAY_MESSAGE:
04AB 75220A         806                 MOV     WDT,#10                 ;Allow 10 seconds for playback of message
04AE E529           807                 MOV     A,MESSAGE               ;A gets message number
04B0 23             808                 RL      A                       ;Multiply by 2 (2 bytes per table entry)
04B1 240D           809                 ADD     A,#13                   ;13 bytes to first MESSAGE_TABLE pointer entry
04B3 83             810                 MOVC    A,@A+PC                 ;A gets first byte of table entry
04B4 F52A           811                 MOV     VRPD_MSG_PTR,A  ;(2) Save looked up message pointer
04B6 E529           812                 MOV     A,MESSAGE               ;(2) A gets message number
04B8 23             813                 RL      A                       ;(1) Multiply by 2 (2 bytes per table entry)
04B9 2406           814                 ADD     A,#6                    ;(2) 5+1 bytes to first MESSAGE_TABLE device entry
04BB 83             815                 MOVC    A,@A+PC                 ;(1) A gets second byte of table entry
04BC F52B           816                 MOV     VRPD,A                  ;(2) Save looked up device number
04BE 0204F7         817                 LJMP    INIT_VRPD               ;(3) Jump to set up appropriate VRPD per table
                    818
                    819         MESSAGE_TABLE:
04C1 00             820         ZEERO:          DB      00h,2   ;Message #00h
```

```
04C2 02
04C3 01      821    ONE:          DB      01h,2   ;   "    #01h
04C4 02
04C5 02      822    TWO:          DB      02h,2   ;   "    #02h
04C6 02
04C7 03      823    THREE:        DB      03h,2   ;   "    #03h
04C8 02
04C9 04      824    FOUR:         DB      04h,2   ;   "    #04h
04CA 02
04CB 05      825    FIFE:         DB      05h,2   ;   "    #05h
04CC 02
04CD 06      826    SIX:          DB      06h,2   ;   "    #06h
04CE 02
04CF 07      827    SEVEN:        DB      07h,2   ;   "    #07h
04D0 02
04D1 08      828    EIGHT:        DB      08h,2   ;   "    #08h
04D2 02
04D3 09      829    NINER:        DB      09h,2   ;   "    #09h
04D4 02
04D5 0A      830    NORTH:        DB      0Ah,2   ;   "    #0Ah
04D6 02
04D7 0B      831    SOUTH:        DB      0Bh,2   ;   "    #0Bh
04D8 02
04D9 0C      832    EAST:         DB      0Ch,2   ;   "    #0Ch
04DA 02
04DB 0D      833    WEST:         DB      0Dh,2   ;   "    #0Dh
04DC 02
04DD 0E      834    TARGET:       DB      0Eh,2   ;   "    #0Eh
04DE 02
04DF 0F      835    POINT:        DB      0Fh,2   ;   "    #0Fh
04E0 02
04E1 10      836    LAST:         DB      10h,2   ;   "    #10h
04E2 02
04E3 00      837    LONGITUDE:    DB      00h,3   ;   "    #11h
04E4 03
04E5 01      838    LATITUDE:     DB      01h,3   ;   "    #12h
04E6 03
04E7 02      839    POSITION:     DB      02h,3   ;   "    #13h
04E8 03
04E9 03      840    RESET_MSG:    DB      03h,3   ;   "    #14h
04EA 03
04EB 04      841    ALERT_TONES:  DB      04h,3   ;   "    #15h
04EC 03
04ED 05      842    NO_GPS:       DB      05h,3   ;   "    #16h
04EE 03
04EF 06      843    A_IS:         DB      06h,3   ;   "    #17h
04F0 03
04F1 07      844    B_IS:         DB      07h,3   ;   "    #18h
04F2 03
04F3 08      845    DEGREES:      DB      08h,3   ;   "    #19h
04F4 03
04F5 09      846    MINUTES:      DB      09h,3   ;   "    #1Ah
04F6 03
             847
             848    INIT_VRPD:
04F7 C2A3    849           CLR    A0                      ;Assume no message cueing required
04F9 D2A4    850           SETB   A4                      ;Select consecutive address mode
04FB D2A0    851           SETB   PD                      ;Reset both VRPD message pointers
04FD C2A0    852           CLR    PD
04FF 752523  853           MOV    MSEC,#PUD_TIME
0502 120560  854           CALL   DLY_MSEC                ;Allow for VRPD 25ms power-up delay
0505 E52B    855           MOV    A,VRPD                  ;A gets device number (2=U2, 3=U3)
0507 B4022B  856           CJNE   A,#2,CUE_U3             ;Jump if message not stored in VRPD U2
             857    CUE_U2:
```

```
050A E52A         858              MOV     A,VRPD_MSG_PTR   ;A gets message pointer
050C 6018         859              JZ      PLAY_U2          ;Jump if ptr = 0 (no message cueing required)
050E FD           860              MOV     R5,A             ;Else R5=A=number of cues (fast forwards) required
050F D2A3         861              SETB    A0               ;Enable message cueing mode
                  862      ASSERT_U2_CE:
0511 C2AF         863              CLR     EA               ;Disable all interrupts during 10us cueing strobe
0513 C2A5         864              CLR     nCEU2            ;Else enable U2 and latch cueing and consec mode
0515 D2A5         865              SETB    nCEU2
0517 D2AF         866              SETB    EA               ;Re-enable all interrupts
                  867      ;        JB      nEOM_U2,$        ;Loop until nEOM_U2 lowers
0519 752511       868              MOV     MSEC,#EOM_TIME
051C 120560       869              CALL    DLY_MSEC         ;Allow for inter-End-Of-Message delay
051F 3095FD       870              JNB     nEOM_U2,$        ;Make sure EOM has risen
0522 DDED         871              DJNZ    R5,ASSERT_U2_CE  ;Loop until cued to desired message
0524 C2A3         872              CLR     A0               ;Disable message cueing
                  873      PLAY_U2:
0526 C2A5         874              CLR     nCEU2            ;Initiate playback of selected message
0528 D2A5         875              SETB    nCEU2
052A C290         876              CLR     nSTATUS          ;Turn on RTU STATUS LED
052C 2095FD       877              JB      nEOM_U2,$        ;Loop until EOM lowers
052F 3095FD       878              JNB     nEOM_U2,$        ;Loop until rising edge of EOM
0532 02055D       879              JMP     RETURN_FROM_PLAY_MESSAGE
                  880
                  881      CUE_U3:
0535 E52A         882              MOV     A,VRPD_MSG_PTR   ;A gets message pointer
0537 6018         883              JZ      PLAY_U3          ;Jump if ptr = 0 (no message cueing required)
0539 FD           884              MOV     R5,A             ;Else R5=A=number of cues (fast forwards) required
053A D2A3         885              SETB    A0               ;Enable message cueing mode
                  886      ASSERT_U3_CE:
053C C2AF         887              CLR     EA               ;Disable all interrupts during 10us cueing strobe
053E C2A6         888              CLR     nCEU3            ;Else enable U3 and latch cueing and consec mode
0540 D2A6         889              SETB    nCEU3
0542 D2AF         890              SETB    EA               ;Re-enable all interrupts
                  891      ;        JB      nEOM_U3,$        ;Loop until nEOM_U3 lowers
0544 752511       892              MOV     MSEC,#EOM_TIME
0547 120560       893              CALL    DLY_MSEC         ;Allow for inter-End-Of-Message delay
054A 3094FD       894              JNB     nEOM_U3,$        ;Make sure EOM has risen
054D DDED         895              DJNZ    R5,ASSERT_U3_CE  ;Loop until cued to desired message
054F C2A3         896              CLR     A0               ;Disable message cueing
                  897      PLAY_U3:
0551 C2A6         898              CLR     nCEU3            ;Initiate playback of selected message
0553 D2A6         899              SETB    nCEU3
0555 C290         900              CLR     nSTATUS          ;Turn on RTU STATUS LED
0557 2094FD       901              JB      nEOM_U3,$        ;Loop until EOM lowers
055A 3094FD       902              JNB     nEOM_U3,$        ;Loop until rising edge of EOM
                  903      RETURN_FRGM_PLAY_MESSAGE:
055D D290         904              SETB    nSTATUS          ;Turn off RTU STATUS LED
055F 22           905              RET
                  906
                  907      ;SSSSSSSSSSSSSSSSSSSSSSSSSSSSSSSSSSSSSSSSSSSSSSSSSSSSSSSSSSSSSSSSSSSSS
                  908      ;SSSSSSSSSSSSSSSSSSSSSSSSSSSSSSSSSSSSSSSSSSSSSSSSSSSSSSSSSSSSSSSSSSSSS
                  909
                  910      ;                                    DLY_ MSEC
                  911      ;SSSSSSSSSSSSSSSSSSSSSSSSSSSSSSSSSSSSSSSSSSSSSSSSSSSSSSSSSSSSSSSSSSSSS
                  912      DLY_MSEC:
0560 C0E0         913              PUSH    ACC
0562 C0D0         914              PUSH    PSW
0564 752600       915              MOV     ONE_MS_TICK,#0
                  916      DLY_MSEC_LOOP:
0567 E526         917              MOV     A,ONE_MS_TICK
0569 C2D7         918              CLR     CY
056B 9525         919              SUBB    A,MSEC
056D 40F8         920              JC      DLY_MSEC_LOOP
056F D0D0         921              POP     PSW
```

```
0571 D0E0              922              POP     ACC
0573 22                923              RET
                       924
                       925      ;SSSSSSSSSSSSSSSSSSSSSSSSSSSSSSSSSSSSSSSSSSSSSSSSSSSSSSSSSSSSSSSSSSSSSSS
                       926      ;SSSSSSSSSSSSSSSSSSSSSSSSSSSSSSSSSSSSSSSSSSSSSSSSSSSSSSSSSSSSSSSSSSSSSSS
                       927
                       928      ;                                        XMTR_ON
                       929      ;SSSSSSSSSSSSSSSSSSSSSSSSSSSSSSSSSSSSSSSSSSSSSSSSSSSSSSSSSSSSSSSSSSSSSSS
                       930      XMTR_ON:
0574 208717            931              JB      XPWR,RETURN_FROM_XMTR_ON ;Jump if xmtr relay already latched on
0577 C293              932              CLR     nXON                     ;Else energize xmtr relay's RESET coil
0579 1205D3            933              CALL    DLY_P1S                  ;Allow 0.1 sec for contact closure & latching
057C D293              934              SETB    nXON                     ;De-energize xmtr relay's RESET coil
057E 1205DC            935              CALL    DLY_P5S                  ;Allow 0.5 sec for xmtr to stabilize
0581 20870A            936              JB      XPWR,RETURN_FROM_XMTR_ON ;Jump if first attempt was successful
0584 C293              937              CLR     nXON                     ;Else re-energize xmtr relay's RESET coil
0586 1205D3            938              CALL    DLY_P1S                  ;Allow 0.1 sec for contact closure & latching
0589 D293              939              SETB    nXON                     ;De-energize xmtr relay's RESET coil
058B 1205DC            940              CALL    DLY_P5S                  ;Allow 0.5 sec for xmtr to stabilize
                       941      RETURN_FROM_XMTR_ON:
058E 22                942              RET                              ;And return
                       943
                       944      ;SSSSSSSSSSSSSSSSSSSSSSSSSSSSSSSSSSSSSSSSSSSSSSSSSSSSSSSSSSSSSSSSSSSSSSS
                       945
                       946      ;                                        XMTR_OFF
                       947      ;SSSSSSSSSSSSSSSSSSSSSSSSSSSSSSSSSSSSSSSSSSSSSSSSSSSSSSSSSSSSSSSSSSSSSSS
                       948      XMTR_OFF:
058F 308711            949              JNB     XPWR,RETURN_FROM_XMTR_OFF ;Jump if xmtr relay already latched off
0592 C292              950              CLR     nXOFF                    ;Else energize xmtr relay's SET coil
0594 1205D3            951              CALL    DLY_P1S                  ;Allow 0.1 sec for contact opening & latching
0597 D292              952              SETB    nXOFF                    ;De-energize xmtr relay's SET coil
0599 308707            953              JNB     XPWR,RETURN_FROM_XMTR_OFF ;Jump if first attempt was successful
059C C292              954              CLR     nXOFF                    ;Else energize xmtr relay's SET coil
059E 1205D3            955              CALL    DLY_P1S                  ;Allow 0.1 sec for contact opening & latching
05A1 D292              956              SETB    nXOFF                    ;De-energize xmtr relay's SET coil
                       957      RETURN_FROM_XMTR_OFF:
05A3 22                958              RET                              ;And return
                       959
                       960      ;SSSSSSSSSSSSSSSSSSSSSSSSSSSSSSSSSSSSSSSSSSSSSSSSSSSSSSSSSSSSSSSSSSSSSSS
                       961      ;SSSSSSSSSSSSSSSSSSSSSSSSSSSSSSSSSSSSSSSSSSSSSSSSSSSSSSSSSSSSSSSSSSSSSSS
                       962
                       963      ;                                        INIT_GPS_RCVR
                       964      ;SSSSSSSSSSSSSSSSSSSSSSSSSSSSSSSSSSSSSSSSSSSSSSSSSSSSSSSSSSSSSSSSSSSSSSS
                       965      INIT_GPS_RCVR:
05A4 C2AC              966              CLR     ES                       ;Disable serial port receive/transmit interrupt
05A6 C299              967              CLR     TI                       ;Clear serial port transmit interrupt flag
05A8 7E0E              968              MOV     R6,#14                   ;Offset by 14 characters between MOVC and message
                       969      INIT_GPS_LOOP:
05AA EE                970              MOV     A,R6                     ;A = R6 = temporary pointer to message characters
05AB 83                971              MOVC    A,@A+PC                  ;A = Character @address = (pointer + PC)
05AC F599              972              MOV     SBUF,A                   ;(2) Copy character to serial port Send Buffer
05AE 3099FD            973              JNB     TI,$                     ;(3) Loop until SBUF is ready for next character
05B1 C299              974              CLR     TI                       ;(2) Clear serial port transmit interrupt flag
05B3 0E                975              INC     R6                       ;(1) Increment character pointer
05B4 BE24F3            976              CJNE    R6,#36,INIT_GPS_LOOP     ;(3) Loop until offset = 36 (14+22 chars sent)
05B7 0205D0            977              LJMP    RETURN_FROM_INIT_GPS_RCVR ;(3) Return after 22nd char sent
05BA 24504D47          978      INIT_GPS_MSG:   DB      '$PMGLI,00,B00,2,A,00',0Dh,0Ah
05BE 4C492C30
05C2 302C4230
05C6 302C322C
05CA 412C3030
05CE 0D
05CF 0A
                       979                                               ;Starts the GPGGA 'Position and Altitude' GPS msg.
```

```
                980    RETURN_FROM_INIT_GPS_RCVR:
05D0 D2AC       981           SETB    ES                      ;Re-enable serial port receive/transmit interrupt
05D2 22         982           RET
                983
                984    ;SSSSSSSSSSSSSSSSSSSSSSSSSSSSSSSSSSSSSSSSSSSSSSSSSSSSSSSSSSSSSSSSSSSSS
                985
                986    ;                                       DLY_P1S
                987    ;SSSSSSSSSSSSSSSSSSSSSSSSSSSSSSSSSSSSSSSSSSSSSSSSSSSSSSSSSSSSSSSSSSSSS
                988    DLY_P1S:
05D3 753000     989           MOV     TICK,#0                 ;Clear relative timer
                990    P1S_LOOP:
05D6 AA30       991           MOV     R2,TICK
05D8 BA02FB     992           CJNE    R2,#2,P1S_LOOP
05DB 22         993           RET
                994
                995    ;SSSSSSSSSSSSSSSSSSSSSSSSSSSSSSSSSSSSSSSSSSSSSSSSSSSSSSSSSSSSSSSSSSSSS
                996    ;SSSSSSSSSSSSSSSSSSSSSSSSSSSSSSSSSSSSSSSSSSSSSSSSSSSSSSSSSSSSSSSSSSSSS
                997
                998    ;                                       DLY_P5S
                999    ;SSSSSSSSSSSSSSSSSSSSSSSSSSSSSSSSSSSSSSSSSSSSSSSSSSSSSSSSSSSSSSSSSSSSS
                1000   DLY_P5S:
05DC 753000     1001          MOV     TICK,#0                 ;Clear relative timer
                1002   P5S_LOOP:
05DF AA30       1003          MOV     R2,TICK
05E1 BA0AFB     1004          CJNE    R2,#10,P5S_LOOP
05E4 22         1005          RET
                1006
                1007   ;SSSSSSSSSSSSSSSSSSSSSSSSSSSSSSSSSSSSSSSSSSSSSSSSSSSSSSSSSSSSSSSSSSSSS
                1008   ;SSSSSSSSSSSSSSSSSSSSSSSSSSSSSSSSSSSSSSSSSSSSSSSSSSSSSSSSSSSSSSSSSSSSS
                1009
                1010   ;                                       DLY_1S
                1011   ;SSSSSSSSSSSSSSSSSSSSSSSSSSSSSSSSSSSSSSSSSSSSSSSSSSSSSSSSSSSSSSSSSSSSS
                1012   DLY_1S:
05E5 753000     1013          MOV     TICK,#0                 ;Clear relative timer
                1014   OS_LOOP:
05E8 AA30       1015          MOV     R2,TICK
05EA BA14FB     1016          CJNE    R2,#20,OS_LOOP
05ED 22         1017          RET
                1018
                1019   ;SSSSSSSSSSSSSSSSSSSSSSSSSSSSSSSSSSSSSSSSSSSSSSSSSSSSSSSSSSSSSSSSSSSSS
                1020   ;SSSSSSSSSSSSSSSSSSSSSSSSSSSSSSSSSSSSSSSSSSSSSSSSSSSSSSSSSSSSSSSSSSSSS
                1021
                1022   ;                                       PLAY_R4_TBUF_DIGITS
                1023   ;SSSSSSSSSSSSSSSSSSSSSSSSSSSSSSSSSSSSSSSSSSSSSSSSSSSSSSSSSSSSSSSSSSSSS
                1024   PLAY_R4_TBUF_DIGITS:
05EE E6         1025          MOV     A,@R0                   ;A gets ASCII digit char from xmit buffer <- R0
05EF C3         1026          CLR     C
05F0 9430       1027          SUBB    A,#30h                  ;Convert from ASCII char to number
05F2 F529       1028          MOV     MESSAGE,A               ;Play the digit
05F4 91AB       1029          CALL    PLAY_MESSAGE
05F6 08         1030          INC     R0                      ;Point to next TBUF character
05F7 DCF5       1031          DJNZ    R4,PLAY_R4_TBUF_DIGITS  ;Loop until all digits have been sent
                1032   ;      CALL    DLY_P5S                 ;Pause between digits
05F9 22         1033          RET
                1034
                1035   ;SSSSSSSSSSSSSSSSSSSSSSSSSSSSSSSSSSSSSSSSSSSSSSSSSSSSSSSSSSSSSSSSSSSSS
                1036
                1037   ;                                       PLAY_TBUF_DIR
                1038   ;SSSSSSSSSSSSSSSSSSSSSSSSSSSSSSSSSSSSSSSSSSSSSSSSSSSSSSSSSSSSSSSSSSSSS
                1039   PLAY_TBUF_DIR:
05FA E6         1040          MOV     A,@R0
                1041   NORTH?:
05FB B44E06     1042          CJNE    A,#'N',SOUTH?
05FE 75290A     1043          MOV     MESSAGE,#0Ah
```

```
0601 020619      1044              JMP      SEND_DIR
                 1045    SOUTH?:
0604 B45306      1046              CJNE     A,#'S',EAST?
0607 75290B      1047              MOV      MESSAGE,#0Bh
060A 020619      1048              JMP      SEND_DIR
                 1049    EAST?:
060D B44506      1050              CJNE     A,#'E',WEST?
0610 75290C      1051              MOV      MESSAGE,#0Ch
0613 020619      1052              JMP      SEND_DIR
                 1053    WEST?:
0616 75290D      1054              MOV      MESSAGE,#0Dh          ;WEST is the default direction
                 1055    SEND_DIR:
0619 91AB        1056              CALL     PLAY_MESSAGE
061B 08          1057              INC      R0
                 1058    ;         CALL     DLY_1S
061C 22          1059              RET
                 1060
                 1061    ;SSSSSSSSSSSSSSSSSSSSSSSSSSSSSSSSSSSSSSSSSSSSSSSSSSSSSSSSSSSSSSSSSSSSS
                 1062    ;SSSSSSSSSSSSSSSSSSSSSSSSSSSSSSSSSSSSSSSSSSSSSSSSSSSSSSSSSSSSSSSSSSSSS
                 1063
                 1064    ;                                         ASCII_TO_REAL
                 1065    ;SSSSSSSSSSSSSSSSSSSSSSSSSSSSSSSSSSSSSSSSSSSSSSSSSSSSSSSSSSSSSSSSSSSSS
                 1066    ASCII_TO_REAL:
061D E52D        1067              MOV      A,RCHAR
061F C3          1068              CLR      C
0620 9440        1069              SUBB     A,#40h
0622 E52D        1070              MOV      A,RCHAR
0624 5004        1071              JNC      CHAR_IS_ALPHA
                 1072    CHAR_IS_NUMERIC:
0626 C3          1073              CLR      C
0627 9430        1074              SUBB     A,#30h
0629 22          1075              RET
                 1076    CHAR_IS_ALPHA:
062A C3          1077              CLR      C
062B 9437        1078              SUBB     A,#37h
062D 22          1079              RET
                 1080
                 1081    ;SSSSSSSSSSSSSSSSSSSSSSSSSSSSSSSSSSSSSSSSSSSSSSSSSSSSSSSSSSSSSSSSSSSSS
                 1082    ;BBBBBBBBBBBBBBBBBBBBBBBBBBBBBBBBBBBBBBBBBBBBBBBBBBBBBBBBBBBBBBBBBBBBB
                 1083
----             1084              BSEG                            ;Beginning if Bit Segment
0000             1085              ORG      00h                    ;... at lowest RAM address above reg banks R0-R3
0000             1086    POS_UPDATED:     DBIT    1                ;Set by SERIAL_PORT_ISR on good sentence
0001             1087    STOP_BIT_ERROR: DBIT     1                ; "  "   "    "    "    "   0 stop bit
0002             1088    FIRST_POS_RCVD: DBIT 1  ;Set upon receipt of 1st valid non-zero position
0003             1089    NON_ZERO_POS:   DBIT 1  ;Set if non-zero position digit received
0004             1090    LEAVE_LED_ON:   DBIT     1                ;Signals TIMER0 ISR not to turn off STATUS LED
                 1091
----             1092              DSEG                            ;Beginning of Data Segment
0022             1093              ORG      22h                    ;Reserve RAM bytes 20-21h of BSEG for flags
0022             1094    WDT:             DS      1                ;Seconds Watch Dog Timer decremented by TIMER0 ISR
0023             1095    SS_WDT:          DS      1                ; "     "    "   "     "       "    "    "
0024             1096    FIFTY_MS:        DS      1                ;Incremented every 50ms (up to 1 second) by TIMER0 ISR
0025             1097    MSEC:            DS      1                ;Number of milliseconds to delay in DLY_MSEC routine
0026             1098    ONE_MS_TICK:     DS      1                ;Changeable relative 1ms counter in TIMER0 ISR
0027             1099    STATUS_LED_TICK:         DS      1        ;ms countdown for serial ISR status
0028             1100    PRE_TICK:        DS      1                ;Non-changeable 1ms counter in TIMER0 ISR
0029             1101    MESSAGE:                 DS      1        ;Contains message no. for "PLAY_MESSAGE" routine
002A             1102    VRPD_MSG_PTR:    DS      1                ;Voice Record Playback Device message pointer
002B             1103    VRPD:            DS      1                ;2 for U2, 3 for U3
002C             1104    I_P_TIMER:       DS      1                ;Inter-position message timer, INT0 ISR decrements
002D             1105    RCHAR:           DS      1                ;Character received from SBUF
002E             1106    CHECKSUM:        DS      1                ;All characters 'ut "$","*", and CS -> checksum
002F             1107    RCHAR_CTR:       DS      1                ;No. of characters received after "$"
```

```
0030        1108    TICK:           DS    1    ;Relative counter incr. by TIMER0 ISR every 50ms
0031        1109    RBUF_PTR:       DS    1    ;SERIAL_PORT_ISR uses this ptr to fill RBUF
            1110
            1111    RBUF_START:
0032        1112    RBUF_LAT_10D:   DS    1    ;Receiver buffer latitude tens of degrees
0033        1113    RBUF_LAT_D:     DS    1    ;     "        "       "   degrees
0034        1114    RBUF_LAT_10M:   DS    1    ;     "        "       "   tens of minutes
0035        1115    RBUF_LAT_M:     DS    1    ;     "        "       "   minutes
0036        1116    RBUF_LAT_P1M:   DS    1    ;     "        "       "   tenths of minutes
0037        1117    RBUF_LAT_P01M:  DS    1    ;     "        "       "   hundredths of minutes
0038        1118    RBUF_LAT_DIR:   DS    1    ;     "        "       "   (N)orth or (S)outh
            1119
0039        1120    RBUF_LONG_100D: DS    1    ;     "        "  longitude hundreds of degrees
003A        1121    RBUF_LONG_10D:  DS    1    ;     "        "       "   tens of degrees
003B        1122    RBUF_LONG_D:    DS    1    ;     "        "       "   degrees
003C        1123    RBUF_LONG_10M:  DS    1    ;     "        "       "   tens of minutes
003D        1124    RBUF_LONG_M:    DS    1    ;     "        "       "   minutes
003E        1125    RBUF_LONG_P1M:  DS    1    ;     "        "       "   tenths of minutes
003F        1126    RBUF_LONG_P01M: DS    1    ;     "        "       "   hundredths of minutes
0040        1127    RBUF_LONG_DIR:  DS    1    ;     "        "       "   (E)ast or (W)est
            1128
            1129    TBUF_START:
0041        1130    TBUF_LAT_10D:   DS    1    ;Transmit buffer latitude tens of degrees
0042        1131    TBUF_LAT_D:     DS    1    ;     "        "       "   degrees
0043        1132    TBUF_LAT_10M:   DS    1    ;     "        "       "   tens of minutes
0044        1133    TBUF_LAT_M:     DS    1    ;     "        "       "   minutes
0045        1134    TBUF_LAT_P1M:   DS    1    ;     "        "       "   tenths of minutes
0046        1135    TBUF_LAT_P01M:  DS    1    ;     "        "       "   hundredths of minutes
0047        1136    TBUF_LAT_DIR:   DS    1    ;     "        "       "   (N)orth or (S)outh
            1137
0048        1138    TBUF_LONG_100D: DS    1    ;     "        "  longitude hundreds of degrees
0049        1139    TBUF_LONG_10D:  DS    1    ;     "        "       "   tens of degrees
004A        1140    TBUF_LONG_D:    DS    1    ;     "        "       "   degrees
004B        1141    TBUF_LONG_10M:  DS    1    ;     "        "       "   tens of minutes
004C        1142    TBUF_LONG_M:    DS    1    ;     "        "       "   minutes
004D        1143    TBUF_LONG_P1M:  DS    1    ;     "        "       "   tenths of minutes
004E        1144    TBUF_LONG_P01M: DS    1    ;     "        "       "   hundredths of minutes
004F        1145    TBUF_LONG_DIR:  DS    1    ;     "        "       "   (E)ast or (W)est
            1146
            1147    ;DDDDDDDDDDDDDDDDDDDDDDDDDDDDDDDDDDDDDDDDDDDDDDDDDDDDDDDDDDDDDDDDDDDDDDD
            1148
            1149            END                     ;End of TGLS4.ASM^
```

SYMBOL TABLE LISTING
------ ----- -------

NAME                    TYPE    VALUE       ATTRIBUTES

A_IS . . . . . . . . . . .  C ADDR  04EFH    A
A0 . . . . . . . . . . . .  B ADDR  00A0H.3  A
A4 . . . . . . . . . . . .  B ADDR  00A0H.4  A
ACC. . . . . . . . . . . .  D ADDR  00E0H    A
ALERT_TONES. . . . . . . .  C ADDR  04EBH    A
ANNOUNCE_RESET . . . . . .  C ADDR  008BH    A
ASCII_TO_REAL. . . . . . .  C ADDR  061DH    A
ASSERT_U2_CE . . . . . . .  C ADDR  0511H    A
ASSERT_U3_CE . . . . . . .  C ADDR  053CH    A
B_IS . . . . . . . . . . .  C ADDR  04F1H    A
BAUD_9600. . . . . . . . .    NUMB  00FDH    A
BEGIN. . . . . . . . . . .  C ADDR  0000H    A

```
BUF_LENGTH . . . . . . . . .    NUMB    000EH   A
CHAR_IS_ALPHA. . . . . . .      C ADDR  062AH   A
CHAR_IS_NUMERIC. . . . . .      C ADDR  0626H   A
CHECK_FOR_1000MS . . . . .      C ADDR  0339H   A
CHECK_FOR_300MS. . . . . .      C ADDR  0317H   A
CHECK_FOR_500MS. . . . . .      C ADDR  032BH   A
CHECK_FOR_700MS. . . . . .      C ADDR  0321H   A
CHECK_FOR_MESSAGE_TEST . .      C ADDR  00ACH   A
CHECK_FOR_RECORD_MODE. . .      C ADDR  0084H   A
CHECK_GPS_STATUS . . . . .      C ADDR  01B2H   A
CHECK_GPS0 . . . . . . . .      C ADDR  026DH   A
CHECK_I_P_TIMER. . . . . .      C ADDR  027BH   A
CHECK_OVERFLOW_LOOP. . . .      C ADDR  02ADH   A
CHECK_REL_TIMERS . . . . .      C ADDR  02F2H   A
CHECK_STATUS_LED_TICK. . .      C ADDR  02E9H   A
CHECK_STATUS_LED . . . . .      C ADDR  02E0H   A
CHECK_VEHICLE_ID . . . . .      C ADDR  00E5H   A
CHECK_WDT. . . . . . . . .      C ADDR  0313H   A
CHECKSUM . . . . . . . . .      D ADDR  002EH   A
CLEAR_BUF_LOOP . . . . . .      C ADDR  004FH   A
CUE_U2 . . . . . . . . . .      C ADDR  050AH   A
CUE_U3 . . . . . . . . . .      C ADDR  0535H   A
CY . . . . . . . . . . . .      B ADDR  00D0H.7 A
DEGREES. . . . . . . . . .      C ADDR  04F3H   A
DLY_1S . . . . . . . . . .      C ADDR  05E5H   A
DLY_MSEC_LOOP. . . . . . .      C ADDR  0567H   A
DLY_MSEC . . . . . . . . .      C ADDR  0560H   A
DLY_P1S. . . . . . . . . .      C ADDR  05D3H   A
DLY_P5S. . . . . . . . . .      C ADDR  05DCH   A
DO_NOT_TRANSFER. . . . . .      C ADDR  045DH   A
EA . . . . . . . . . . . .      B ADDR  00A8H.7 A
EAST . . . . . . . . . . .      C ADDR  04D9H   A
EAST?. . . . . . . . . . .      C ADDR  060DH   A
EIGHT. . . . . . . . . . .      C ADDR  04D1H   A
ENABLE_HOMING. . . . . . .      C ADDR  0279H   A
ENABLE_RECORD_INT1 . . . .      C ADDR  0266H   A
END_USER_MESSAGE_PLAYBACK.      C ADDR  048FH   A
END_USER_MESSAGE_RECORDING      C ADDR  02B3H   A
EOM_TIME . . . . . . . . .      NUMB    0011H   A
ES . . . . . . . . . . . .      B ADDR  00A8H.4 A
EX1. . . . . . . . . . . .      B ADDR  00A8H.2 A
F_U. . . . . . . . . . . .      B ADDR  0090H.1 A
FIFE . . . . . . . . . . .      C ADDR  04CBH   A
FIFTY_MS . . . . . . . . .      D ADDR  0024H   A
FIRST_POS_RCVD . . . . . .      B ADDR  0020H.2 A
FLASH_STATUS_LED . . . . .      C ADDR  00DCH   A
FLICKER_LOOP . . . . . . .      C ADDR  049EH   A
FLICKER_STATUS_LED . . . .      C ADDR  049CH   A
FOUR . . . . . . . . . . .      C ADDR  04C9H   A
GOOD_POSITION_STATUS . . .      C ADDR  0455H   A
GPS_ONLY . . . . . . . . .      C ADDR  0270H   A
GPS_TIME . . . . . . . . .      NUMB    000AH   A
GPS_WDT_TIMEOUT_LOOP . . .      C ADDR  008EH   A
H_G. . . . . . . . . . . .      B ADDR  00B0H.4 A
I_P_TIME . . . . . . . . .      NUMB    0078H   A
I_P_TIMER. . . . . . . . .      D ADDR  002CH   A
IE . . . . . . . . . . . .      D ADDR  00A8H   A
IE1. . . . . . . . . . . .      B ADDR  0088H.3 A
INIT_GPS_LOOP. . . . . . .      C ADDR  05AAH   A
INIT_GPS_MSG . . . . . . .      C ADDR  05BAH   A
INIT_GPS_RCVR. . . . . . .      C ADDR  05A4H   A
INIT_INTER_POS_TIMER . . .      C ADDR  0196H   A
INIT_VRPD. . . . . . . . .      C ADDR  04F7H   A
INIT . . . . . . . . . . .      C ADDR  0026H   A
```

```
INITIALIZE_GPS_RCVR. . . . .  C ADDR   007EH    A
INITIALIZE_REGISTERS . . .    C ADDR   0057H    A
INITIALIZE_STATUS_FLAGS. .    C ADDR   0072H    A
INT0_ISR . . . . . . . . .    C ADDR   0287H    A
INT1_ISR . . . . . . . . .    C ADDR   028EH    A
IP . . . . . . . . . . . .    D ADDR   00B8H    A
IT1. . . . . . . . . . . .    B ADDR   0088H.2  A
J_POWER_UP_VRPD. . . . . .    C ADDR   0285H    A
J_POWER_UP_XMTR. . . . . .    C ADDR   00FDH    A
LAST . . . . . . . . . . .    C ADDR   04E1H    A
LATITUDE . . . . . . . . .    C ADDR   04E5H    A
LEAVE_LED_ON . . . . . . .    B ADDR   0020H.4  A
LONGITUDE. . . . . . . . .    C ADDR   04E3H    A
LOOK_UP_RESPONSE . . . . .    C ADDR   0373H    A
MESSAGE_MAX. . . . . . . .    NUMB     001AH    A
MESSAGE_TABLE. . . . . . .    C ADDR   04C1H    A
MESSAGE. . . . . . . . . .    D ADDR   0029H    A
MINUTES. . . . . . . . . .    C ADDR   04F5H    A
MSEC . . . . . . . . . . .    D ADDR   0025H    A
NCEU2. . . . . . . . . . .    B ADDR   00A0H.5  A
NCEU3. . . . . . . . . . .    B ADDR   00A0H.6  A
NEOM_U2. . . . . . . . . .    B ADDR   0090H.5  A
NEOM_U3. . . . . . . . . .    B ADDR   0090H.4  A
NGPSO. . . . . . . . . . .    B ADDR   0080H.0  A
NINER. . . . . . . . . . .    C ADDR   04D3H    A
NO_GPS . . . . . . . . . .    C ADDR   04EDH    A
NO_POSITION_STATUS . . . .    C ADDR   0460H    A
NON_ZERO_POS . . . . . . .    B ADDR   0020H.3  A
NORTH. . . . . . . . . . .    C ADDR   04D5H    A
NORTH? . . . . . . . . . .    C ADDR   05FBH    A
NREC . . . . . . . . . . .    B ADDR   00B0H.3  A
NSIGA. . . . . . . . . . .    B ADDR   00A0H.1  A
NSIGB. . . . . . . . . . .    B ADDR   00A0H.2  A
NSTATUS. . . . . . . . . .    B ADDR   0090H.0  A
NVID1. . . . . . . . . . .    B ADDR   0080H.1  A
NVID2. . . . . . . . . . .    B ADDR   0080H.2  A
NVID4. . . . . . . . . . .    B ADDR   0080H.3  A
NXOFF. . . . . . . . . . .    B ADDR   0090H.2  A
NXON . . . . . . . . . . .    B ADDR   0090H.3  A
ONE_HZ . . . . . . . . . .    B ADDR   00B0H.2  A
ONE_MS_TICK. . . . . . . .    D ADDR   0026H    A
ONE. . . . . . . . . . . .    C ADDR   04C3H    A
OS_LOOP. . . . . . . . . .    C ADDR   05E8H    A
P_R. . . . . . . . . . . .    B ADDR   00A0H.7  A
P001_SEC_HI. . . . . . . .    NUMB     00FCH    A
P001_SEC_LO. . . . . . . .    NUMB     0066H    A
P0 . . . . . . . . . . . .    D ADDR   0080H    A
P1 . . . . . . . . . . . .    D ADDR   0090H    A
P1S_LOOP . . . . . . . . .    C ADDR   05D6H    A
P2 . . . . . . . . . . . .    D ADDR   00A0H    A
P3 . . . . . . . . . . . .    D ADDR   00B0H    A
P5S_LOOP . . . . . . . . .    C ADDR   05DFH    A
PCON . . . . . . . . . . .    NUMB     0087H    A
PD . . . . . . . . . . . .    B ADDR   00A0H.0  A
PLAY_MESSAGE . . . . . . .    C ADDR   04ABH    A
PLAY_R4_TBUF_DIGITS. . . .    C ADDR   05EEH    A
PLAY_TBUF_DIR. . . . . . .    C ADDR   05FAH    A
PLAY_U2. . . . . . . . . .    C ADDR   0526H    A
PLAY_U3. . . . . . . . . .    C ADDR   0551H    A
PLAY_USER_MESSAGE. . . . .    C ADDR   046AH    A
POINT. . . . . . . . . . .    C ADDR   04DFH    A
POS_UPDATED. . . . . . . .    B ADDR   0020H.0  A
POSITION . . . . . . . . .    C ADDR   04E7H    A
POWER_DOWN_8751. . . . . .    C ADDR   0273H    A
```

```
POWER_DOWN_VRPD. . . . . . .    C ADDR    0262H    A
POWER_UP_VRPD. . . . . . . .    C ADDR    00CAH    A
POWER_UP_XMTR. . . . . . . .    C ADDR    018FH    A
PRE_TICK . . . . . . . . . .    D ADDR    0028H    A
PREPARE_TO_RECORD. . . . . .    C ADDR    0100H    A
PSW. . . . . . . . . . . . .    D ADDR    00D0H    A
PU_VRPD_FOR_UDM_PLAYBACK . .    C ADDR    046EH    A
PU_VRPD_FOR_UDM. . . . . . .    C ADDR    0297H    A
PUD_TIME . . . . . . . . . .    NUMB      0023H    A
RB8. . . . . . . . . . . . .    B ADDR    0098H.2  A
RBUF_LAT_10D . . . . . . . .    D ADDR    0032H    A
RBUF_LAT_10M . . . . . . . .    D ADDR    0034H    A
RBUF_LAT_D . . . . . . . . .    D ADDR    0033H    A
RBUF_LAT_DIR . . . . . . . .    D ADDR    0038H    A
RBUF_LAT_M . . . . . . . . .    D ADDR    0035H    A
RBUF_LAT_P01M. . . . . . . .    D ADDR    0037H    A
RBUF_LAT_P1M . . . . . . . .    D ADDR    0036H    A
RBUF_LONG_100D . . . . . . .    D ADDR    0039H    A
RBUF_LONG_10D. . . . . . . .    D ADDR    003AH    A
RBUF_LONG_10M. . . . . . . .    D ADDR    003CH    A
RBUF_LONG_D. . . . . . . . .    D ADDR    003BH    A
RBUF_LONG_DIR. . . . . . . .    D ADDR    0040H    A
RBUF_LONG_M. . . . . . . . .    D ADDR    003DH    A
RBUF_LONG_P01M . . . . . . .    D ADDR    003FH    A
RBUF_LONG_P1M. . . . . . . .    D ADDR    003EH    A
RBUF_PTR . . . . . . . . . .    D ADDR    0031H    A
RBUF_START . . . . . . . . .    D ADDR    0032H    A
RCHAR_CTR_OK . . . . . . . .    C ADDR    0381H    A
RCHAR_CTR. . . . . . . . . .    D ADDR    002FH    A
RCHAR_EQ_0 . . . . . . . . .    C ADDR    0404H    A
RCHAR. . . . . . . . . . . .    D ADDR    002DH    A
RECORD_U2_LOOP . . . . . . .    C ADDR    0126H    A
RECORD_U2_MESSAGES . . . . .    C ADDR    0113H    A
RECORD_U3_LOOP . . . . . . .    C ADDR    0163H    A
RECORD_U3_MESSAGES . . . . .    C ADDR    0150H    A
RESET_MSG. . . . . . . . . .    C ADDR    04E9H    A
RESPOND_TO_1 . . . . . . . .    C ADDR    03CFH    A
RESPOND_TO_2 . . . . . . . .    C ADDR    03DDH    A
RESPOND_TO_3 . . . . . . . .    C ADDR    03EBH    A
RESPOND_TO_4 . . . . . . . .    C ADDR    0409H    A
RESPOND_TO_5 . . . . . . . .    C ADDR    041DH    A
RESPOND_TO_6 . . . . . . . .    C ADDR    0425H    A
RESPOND_TO_7 . . . . . . . .    C ADDR    0432H    A
RESPOND. . . . . . . . . . .    C ADDR    03C4H    A
RESPONSE_TABLE . . . . . . .    C ADDR    0389H    A
RESUME_MAIN_LOOP . . . . . .    C ADDR    0276H    A
RETURN_FROM_INIT_GPS_RCVR.      C ADDR    05D0H    A
RETURN_FROM_PLAY_MESSAGE .      C ADDR    055DH    A
RETURN_FROM_SERIAL_ISR . .      C ADDR    0465H    A
RETURN_FROM_TIMER0_ISR . .      C ADDR    0340H    A
RETURN_FROM_XMTR_OFF . . .      C ADDR    05A3H    A
RETURN_FROM_XMTR_ON. . . .      C ADDR    058EH    A
RI . . . . . . . . . . . . .    B ADDR    0098H.0  A
RXDTA. . . . . . . . . . . .    B ADDR    00B0H.1  A
SBUF . . . . . . . . . . . .    D ADDR    0099H    A
SCON . . . . . . . . . . . .    D ADDR    0098H    A
SEND_A_B . . . . . . . . . .    C ADDR    0235H    A
SEND_A . . . . . . . . . . .    C ADDR    0244H    A
SEND_ALERT_TONE. . . . . . .    C ADDR    0199H    A
SEND_B . . . . . . . . . . .    C ADDR    0259H    A
SEND_DIR . . . . . . . . . .    C ADDR    0619H    A
SEND_NEW_POSITION. . . . . .    C ADDR    01D0H    A
SEND_POSITION. . . . . . . .    C ADDR    01C7H    A
SEND_UDM . . . . . . . . . .    C ADDR    025FH    A
```

```
SEND_VEHICLE_ID. . . . . .   C ADDR   019FH   A
SERIAL_PORT_ISR. . . . . .   C ADDR   0345H   A
SEVEN. . . . . . . . . . .   C ADDR   04CFH   A
SIX. . . . . . . . . . . .   C ADDR   04CDH   A
SOUTH. . . . . . . . . . .   C ADDR   04D7H   A
SOUTH? . . . . . . . . . .   C ADDR   0604H   A
SP . . . . . . . . . . . .   D ADDR   0081H   A
SS_WDT . . . . . . . . . .   D ADDR   0023H   A
STATUS_LED_TICK. . . . . .   D ADDR   0027H   A
STOP_BIT_ERROR . . . . . .   B ADDR   0020H.1 A
STOP_BIT_OK. . . . . . . .   C ADDR   035CH   A
STOP_U2_RECORDING. . . . .   C ADDR   0133H   A
STOP_U3_RECORDING. . . . .   C ADDR   0170H   A
TARGET . . . . . . . . . .   C ADDR   04DDH   A
TBUF_LAT_100 . . . . . . .   D ADDR   0041H   A
TBUF_LAT_10M . . . . . . .   D ADDR   0043H   A
TBUF_LAT_D . . . . . . . .   D ADDR   0042H   A
TBUF_LAT_DIR . . . . . . .   D ADDR   0047H   A
TBUF_LAT_M . . . . . . . .   D ADDR   0044H   A
TBUF_LAT_P01M. . . . . . .   D ADDR   0046H   A
TBUF_LAT_P1M . . . . . . .   D ADDR   0045H   A
TBUF_LONG_100D . . . . . .   D ADDR   0048H   A
TBUF_LONG_10D. . . . . . .   D ADDR   0049H   A
TBUF_LONG_10M. . . . . . .   D ADDR   004BH   A
TBUF_LONG_D. . . . . . . .   D ADDR   004AH   A
TBUF_LONG_DIR. . . . . . .   D ADDR   004FH   A
TBUF_LONG_M. . . . . . . .   D ADDR   004CH   A
TBUF_LONG_P01M . . . . . .   D ADDR   004EH   A
TBUF_LONG_P1M. . . . . . .   D ADDR   004DH   A
TBUF_START . . . . . . . .   D ADDR   0041H   A
TCON . . . . . . . . . . .   D ADDR   0088H   A
TEST_ALL_MESSAGES. . . . .   C ADDR   00AFH   A
TEST_MESSAGE_LOOP. . . . .   C ADDR   00BBH   A
TH0. . . . . . . . . . . .   D ADDR   008CH   A
TH1. . . . . . . . . . . .   D ADDR   008DH   A
THREE. . . . . . . . . . .   C ADDR   04C7H   A
TI . . . . . . . . . . . .   B ADDR   0098H.1 A
TICK . . . . . . . . . . .   D ADDR   0030H   A
TIMER0_ISR . . . . . . . .   C ADDR   02D2H   A
TL0. . . . . . . . . . . .   D ADDR   008AH   A
TL1. . . . . . . . . . . .   D ADDR   008BH   A
TMEN . . . . . . . . . . .   B ADDR   0080H.4 A
TMOD . . . . . . . . . . .   D ADDR   0089H   A
TR0. . . . . . . . . . . .   B ADDR   0088H.4 A
TRANSFER_LOOP. . . . . . .   C ADDR   0442H   A
TRANSFER . . . . . . . . .   C ADDR   043CH   A
TWO. . . . . . . . . . . .   C ADDR   04C5H   A
TXDTA. . . . . . . . . . .   B ADDR   0080H.0 A
U2_RECORD_OVERFLOW . . . .   C ADDR   012CH   A
U3_RECORD_OVERFLOW . . . .   C ADDR   0169H   A
VRPD_MSG_PTR . . . . . . .   D ADDR   002AH   A
VRPD . . . . . . . . . . .   D ADDR   002BH   A
WD_RST . . . . . . . . . .   B ADDR   0090H.6 A
WDT. . . . . . . . . . . .   D ADDR   0022H   A
WEST . . . . . . . . . . .   C ADDR   04DBH   A
WEST?. . . . . . . . . . .   C ADDR   0616H   A
WRITE_PROTECT_CHECK. . . .   C ADDR   00F1H   A
XMTR_OFF . . . . . . . . .   C ADDR   058FH   A
XMTR_ON. . . . . . . . . .   C ADDR   0574H   A
XPWR . . . . . . . . . . .   B ADDR   0080H.7 A
ZEERO. . . . . . . . . . .   C ADDR   04C1H   A

REGISTER BANK(S) USED: 0
```

What is claimed is:

1. An audio information system for determining a present location, said audio information system comprising:

a global position system receiver for providing electrical signals representative of a plurality of ASCII data characters, said ASCII data characters including latitude and longitude spherical coordinates indicative of the present location of said global position system receiver;

a microprocessor coupled to said global position system receiver for receiving said plurality of ASCII data characters, said microprocessor, responsive to said plurality of ASCII characters, generating a voice playback signal and a logic signal having a first logic state and a second logic state;

a voice recorder/playback circuit coupled to said microprocessor, said voice recorder/playback circuit having a message table comprising a plurality of position indicating words;

said voice recorder/playback circuit, responsive to said voice playback signal, sequencing a predetermined number of said plurality of position indicating words to form a position message signal, said position message signal including said latitude and longitude spherical coordinates;

a programmed crystal oscillator for generating a square wave signal having a first predetermined frequency;

a sinewave oscillator having an input connected to said programmed crystal oscillator for receiving said square wave signal and an output, said sinewave oscillator, responsive to said square wave signal, generating a modulated sinewave signal having a second predetermined frequency;

a demultiplexer having a first input connected to the output of said sinewave oscillator for receiving said modulated sinewave signal, a second input connected to said microprocessor for receiving said logic signal and a third input connected to said voice recorder/playback circuit for receiving said position message signal;

said demultiplexer passing said position message signal to the output of said demultiplexer when said logic signal is at said first logic state;

said demultiplexer passing said modulated sinewave signal to the output of said demultiplexer when said logic signal is at said second logic state;

a transmitter having an input connected to the output of said demultiplexer for receiving said position message signal when said logic signal is at said first logic state and said modulated sinewave signal when said logic signal is at said second logic state;

said transmitter having an antenna, said antenna transmitting said position message signal at a third predetermined frequency when said logic signal is at said first logic state, said position message signal providing an indication of the present location of said global position system receiver;

said antenna transmitting said modulated sinewave signal when said logic signal is at said second logic state; and a speaker coupled to said voice recorder/playback circuit for receiving said position message signal, said speaker, responsive to said position message signal, broadcasting an oral voice report, said oral voice report including said latitude and longitude spherical coordinates indicative of the present location of said global position system receiver.

2. The audio information apparatus of claim 1 wherein said third predetermined frequency is a radio frequency between about 150 kilohertz and 3000 gigahertz.

3. The audio information apparatus of claim 1 further comprising:

an inverter having an input connected to said microprocessor and an output; and a light emitting diode connected to the output of said inverter.

4. The audio information system of claim 1 wherein said second predetermined frequency is about one kilohertz.

5. The audio information system of claim 1 wherein said plurality of ASCII data characters comprises fifty nine ASCII data characters.

6. The audio information apparatus of claim 1 wherein each of said latitude and longitude spherical coordinates broadcast by said speaker has a direction, said direction being north or south for each of said latitude spherical coordinates and east or west for each of said longitude spherical coordinates.

7. The audio information system of claim 1 wherein said first predetermined frequency is about one hertz.

8. An audio information system for determining a present location, said audio information system comprising:

a global position system receiver for providing electrical signals representative of a plurality of ASCII data characters, said ASCII data characters including latitude and longitude spherical coordinates indicative of the present location of said global position system receiver;

a microprocessor coupled to said global position system receiver for receiving said plurality of ASCII data characters, said microprocessor, responsive to said plurality of ASCII characters, generating a voice playback signal, a transmitter on signal, a transmitter off signal and a logic signal having a first logic state and a second logic state;

a voice recorder/playback circuit coupled to said microprocessor, said voice recorder/playback circuit having a message table comprising a plurality of position indicating words;

said voice recorder/playback circuit, responsive to said voice playback signal, sequencing a predetermined number of said plurality of position indicating words to form a position message signal, said position message signal including said latitude and longitude spherical coordinates;

a programmed crystal oscillator for generating a square wave signal having a first predetermined frequency;

a sinewave oscillator having an input connected to said programmed crystal oscillator for receiving said square wave signal and an output, said sinewave oscillator, responsive to said square wave signal, generating a modulated sinewave signal having a second predetermined frequency;

a demultiplexer having a first input connected to the output of said sinewave oscillator for receiving said modulated sinewave signal, a second input connected to said microprocessor for receiving said logic signal and a third input connected to said voice recorder/playback circuit for receiving said position message signal;

said demultiplexer passing said position message signal to the output of said demultiplexer when said logic signal is at said first logic state;

said demultiplexer passing said modulated sinewave signal to the output of said demultiplexer when said logic signal is at said second logic state;

a transmitter having a first input connected to the output of said demultiplexer for receiving said position message signal when said logic signal is at said first logic state and said modulated sinewave signal when said logic signal is at said second logic state;

said transmitter having an antenna, said antenna transmitting said position message signal at a third predetermined frequency when said logic signal is at said first logic state, said position message signal providing an indication of the present location of said global position system receiver;

said antenna transmitting said modulated sinewave signal when said logic signal is at said second logic state;

relay means connected to said microprocessor for receiving said transmitter on signal and said transmitter off signal, said relay means being coupled to said transmitter, said relay means responsive to said transmitter on signal providing a direct current voltage signal to said transmitter turning on said transmitter allowing said antenna to transmit said position message signal, said relay means responsive to said transmitter off signal turning off said transmitter by preventing said direct current voltage signal from being supplied to said transmitter; and a speaker coupled to said voice recorder/playback circuit for receiving said position message signal, said speaker, responsive to said position message signal, broadcasting an oral voice report, said oral voice report including said latitude and longitude spherical coordinates indicative of the present location of said global position system receiver.

9. The audio information apparatus of claim 8 further comprising a normally open record button having a first terminal connected to ground and a second terminal connected to said microprocessor.

10. The audio information apparatus of claim 8 further comprising a microphone connected to said voice recorder/playback circuit.

11. The audio information apparatus of claim 8 wherein said third predetermined frequency is a radio frequency between about 150 kilohertz and 3000 gigahertz.

12. The audio information apparatus of claim 8 wherein said relay means comprises:

a NAND gate having an input connected to said microprocessor for receiving said transmitter on signal, and an output;

an inverter having an input for receiving said transmitter off signal and an output;

a first voltage source for providing said direct current voltage signal;

a second voltage source for providing about plus twelve volts;

a first field effect transistor having a gate connected to the output of said inverter, a source connected to ground and a drain;

a second field effect transistor having a gate connected to the output of said NAND gate, a source connected to ground and a drain; and a relay having a SET coil, a RESET coil and a contact;

said SET coil of said relay having a first terminal connected to said second voltage source and a second terminal connected to the drain of said first field effect transistor;

said RESET coil of said relay having a first terminal connected to said second voltage source and a second terminal connected to the drain of said second field effect transistor;

said contact of said relay having a first terminal connected to said first voltage source and a second terminal connected to said transmitter.

13. The audio information system of claim 8 wherein said plurality of ASCII data characters comprises fifty nine ASCII data characters.

14. The audio information apparatus of claim 8 wherein each of said latitude and longitude spherical coordinates broadcast by said speaker has a direction, said direction being north or south for each of said latitude spherical coordinates and east or west for each of said longitude spherical coordinates.

15. The audio information system of claim 8 wherein said first predetermined frequency is about one hertz.

16. The audio information system of claim 8 wherein said second predetermined frequency is about one kilohertz.

17. The audio information apparatus of claim 8 further comprising:

an inverter having an input connected to said microprocessor and an output; and a light emitting diode connected to the output of said inverter.

* * * * *